(12) United States Patent
Yanagi et al.

(10) Patent No.: US 8,386,570 B2
(45) Date of Patent: Feb. 26, 2013

(54) ELECTRONIC MAIL COMMUNICATION DEVICE

(75) Inventors: Satoru Yanagi, Nagoya (JP); Yasuhiro Kudo, Ichinomiya (JP); Masaaki Hibino, Yokkaichi (JP); Shohei Tsujimoto, Nagoya (JP); Takeshi Izaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 861 days.

(21) Appl. No.: 11/840,865

(22) Filed: Aug. 17, 2007

(65) Prior Publication Data

US 2008/0046523 A1    Feb. 21, 2008

(30) Foreign Application Priority Data

Aug. 18, 2006    (JP) .................................. 2006-223451

(51) Int. Cl.
*G06F 15/16* (2006.01)
*G06F 15/177* (2006.01)

(52) U.S. Cl. ........ 709/206; 709/220; 709/221; 709/222; 709/227; 709/228; 709/229

(58) Field of Classification Search .................. None
See application file for complete search history.

(56) References Cited

U.S. PATENT DOCUMENTS

| | | | |
|---|---|---|---|
| 5,905,495 A * | 5/1999 | Tanaka et al. .................. 726/14 |
| 6,035,324 A | 3/2000 | Chang et al. | |
| 6,434,405 B1 | 8/2002 | Sashihara | |
| 6,662,312 B1 | 12/2003 | Keller et al. | |
| 6,775,239 B1 | 8/2004 | Akita et al. | |
| 6,775,559 B1 | 8/2004 | Weghorst et al. | |
| 6,825,947 B1 | 11/2004 | Asai | |
| 7,346,659 B2 * | 3/2008 | Matsuura et al. ............. 709/206 |
| 7,509,678 B2 | 3/2009 | Pearson et al. | |

(Continued)

FOREIGN PATENT DOCUMENTS

| | | |
|---|---|---|
| EP | 0812100 A2 | 10/1997 |
| JP | H01-113678 A | 5/1989 |

(Continued)

OTHER PUBLICATIONS

European Patent Office, European Search Report for Related EP Application No. 07253259 dated Nov. 13, 2007.

(Continued)

*Primary Examiner* — Thu Nguyen
*Assistant Examiner* — Angela Widhalm
(74) *Attorney, Agent, or Firm* — Baker Botts L.L.P.

(57) ABSTRACT

An electronic mail communication device is used in connection with a server for communicating an electronic mail. The electronic mail communication device is provided with an input device that inputs an electronic mail communication command, a storage that stores information indicating whether or not an electronic mail communication through the server is enabled, and a communication control device. The communication control device outputs a signal to the server to establish connection with the server in a case where the electronic mail communication command is input to the input device while the information indicating the communication enable state is stored in the storage. The communication control device inhibits from outputting the signal to the server in a case where the electronic mail communication command is input to the input device while the information indicating the communication disable state is stored in the storage.

10 Claims, 15 Drawing Sheets

U.S. PATENT DOCUMENTS

| | | | |
|---|---|---|---|
| 2003/0040280 A1 | 2/2003 | Koskelainen | |
| 2003/0074412 A1* | 4/2003 | Muto | 709/206 |
| 2003/0172166 A1 | 9/2003 | Judge et al. | |
| 2004/0123168 A1 | 6/2004 | Joo et al. | |
| 2004/0133775 A1* | 7/2004 | Callas et al. | 713/153 |
| 2004/0170171 A1 | 9/2004 | Kanekar et al. | |
| 2004/0181580 A1* | 9/2004 | Baranshamaje | 709/206 |
| 2004/0268148 A1 | 12/2004 | Karjala et al. | |
| 2005/0108530 A1 | 5/2005 | Tonegawa | |
| 2005/0125528 A1* | 6/2005 | Burke et al. | 709/223 |
| 2005/0193111 A1 | 9/2005 | Roy | |
| 2006/0009243 A1 | 1/2006 | Dahan et al. | |
| 2006/0010426 A1 | 1/2006 | Lewis et al. | |
| 2006/0036690 A1* | 2/2006 | O'Neil | 709/206 |
| 2006/0041505 A1 | 2/2006 | Enyart | |
| 2006/0212703 A1* | 9/2006 | Kojima | 713/175 |
| 2006/0224681 A1* | 10/2006 | Wurster | 709/206 |
| 2006/0253597 A1 | 11/2006 | Mujica | |
| 2006/0277265 A1 | 12/2006 | Backholm et al. | |
| 2006/0294365 A1 | 12/2006 | Bae | |
| 2008/0046521 A1 | 2/2008 | Yanagi et al. | |
| 2008/0263168 A1* | 10/2008 | Ishii | 709/206 |

FOREIGN PATENT DOCUMENTS

| | | |
|---|---|---|
| JP | H11-13678 A | 5/1989 |
| JP | H01-145737 A | 6/1989 |
| JP | H11-45737 A | 6/1989 |
| JP | H03-263151 A | 11/1991 |
| JP | H04-281536 A | 10/1992 |
| JP | 2000330890 A | 11/2000 |
| JP | 2001-044995 A | 2/2001 |
| JP | 2004213534 A | 7/2004 |
| JP | 2004282650 A | 10/2004 |
| JP | 2004287492 A | 10/2004 |
| WO | 2005015925 A2 | 2/2005 |
| WO | WO 2005057899 A1 * | 6/2005 |
| WO | 2006058967 A1 | 6/2006 |

OTHER PUBLICATIONS

"SMTP Service Extension for Authentication" RFC 2554, Internet Engineering Task Force, Mar. 1999.

"Simple Mail Transfer Protocol", RFC 2821, Internet Engineering Task Force, Apr. 2001.

European Patent Office; European Search Report in Application No. 07 253 260.9 mailed Apr. 22, 2009.

Notification of Reasons for Refusal for Japanese Patent Application No. 2006-223450, date Jul. 3, 2008.

Notification of Reasons for Refusal for Japanese Patent Application No. 2006-224491, date Jul. 30, 2008.

European Patent Office, Communication in EP Appl'n No. 07253260.9-2416 (counterpart to above-captioned U.S. patent appl'n) dated Oct. 24, 2007.

Notification of Reasons for Refusal for Japanese Patent Application No. 2006-223450, dated Jul. 15, 2008.

Notification of Reasons for Refusal for Japanese Patent Application No. 2006-224491, dated Aug. 5, 2008.

Japanese Patent Office, Notification of Reasons for Rejection for Japanese Patent Application No. 2006-223451 (counterpart to above-captioned patent application), mailed Sep. 9, 2008.

U.S. Patent and Trademark Office; Office Action in co-pending U.S. Appl. No. 11/838,372, Notification Date Sep. 21, 2009.

* cited by examiner

Communication Test Setting Data
Test          Regularly ○   Irregularly ● ← 150
Frequency [ 01 ] min ← 152
Test Inhibition [ 20 ] O'clock ~ [ 07 ] O'clock ← 154
Period

ELECTRONIC MAIL COMMUNICATION DEVICE

CROSS-REFERENCE TO RELATED APPLICATION

This application claims priority to Japanese Patent Application No. 2006-223451, filed on Aug. 18, 2006, the contents of which are hereby incorporated by reference into the present application.

BACKGROUND OF THE INVENTION

1. Field of the Invention

The present invention relates to an electronic mail (e-mail) communication device used in connection with a server for communicating (sending and/or receiving) an e-mail. The broadly interpreted "e-mail communication device" includes a personal computer, a server, a multi-function device, and an internet facsimile, for example.

2. Description of the Related Art

Japanese Patent Application Publication No. 2000-330890 discloses an internet facsimile connected to a server for communicating e-mails. The internet facsimile is provided with a scanner. The internet facsimile is capable of sending the scanned data by utilizing e-mail. The internet facsimile is provided with a printer that prints the contents of the received e-mail. Generally, internet facsimiles are used in connection with a terminal device via a communication line such as LAN. A user generates an e-mail communication command (sending command and/or receiving command) by the use of the terminal device. The terminal device outputs the e-mail communication command to the internet facsimile.

In response to the input of the e-mail receiving command, the internet facsimile executes TCP connection to an e-mail receiving server, and then outputs data for user authentication (user ID and password) to the e-mail receiving server. In the case of success in the user authentication, the e-mail receiving server sends the e-mail to the internet facsimile. Thus, the internet facsimile receives the e-mail. In the case where the e-mail sending command is input, the internet facsimile executes the TCP connection to an e-mail sending server. Thereafter, the e-mail is sent via the e-mail sending server.

BRIEF SUMMARY OF THE INVENTION

In this specification, a signal or data to be output from an e-mail communication device (the internet facsimile described above, for example) to a server (e-mail sending or receiving server) for a period from the input of the e-mail communication command (sending or receiving command) to the communication (sending or receiving) of e-mail will be referred to as "signal for establishing connection with the server". The signal for establishing the connection with the server may include a signal sent for executing TCP connection, data for user authentication and the like. The signal for establishing the connection with the server will be simply referred to as "connection establishing signal".

In a case where the server fails to function normally, the e-mail communication device is not allowed to communicate the e-mail through the server. Furthermore, the e-mail communication device stores various types of communication setting data for the e-mail communication. The communication setting data may include data for identifying the server, data for identifying user, password, data for identifying user authentication method etc. For example, in a case where the password is not correct, the e-mail communication device may not allowed to communicate the e-mail through the server. The generally employed e-mail communication device is structured to output the connection establishing signal in response to the input of the e-mail communication command even in a case where the e-mail cannot be communicated through the server, resulting in sending unnecessary signal from the e-mail communication device to the server.

An e-mail communication device disclosed in the present specification is used in connection with a server for communicating an e-mail. The e-mail communication device is provided with an input device, storage and a communication control device. The input device inputs an electronic mail communication command. The e-mail communication command may be input by a user who operates an operation panel provided on the e-mail communication device. The input device may input the e-mail communication command that has been output from a terminal device.

The storage stores information indicating whether or not an electronic mail communication through the server is enabled. The communication control device outputs the connection establishing signal to the server in a case where the electronic mail communication command is input to the input device while the information indicating the communication enable state is stored in the storage. After the connection establishing signal is output to the server, an e-mail is communicated between the e-mail communication device and the server.

On the other hand, the communication control device inhibits from outputting the connection establishing signal to the server in a case where the electronic mail communication command is input to the input device while the information indicating the communication disable state is stored in the storage. This means that the output of at least one type of the connection establishing signal to the server is inhibited. That is, the communication control device may inhibit from outputting only one type of the connection establishing signal, and the communication control device may inhibit from outputting all types of the connection establishing signals.

In the case where the e-mail communication through the server is disabled, the connection establishing signal is not sent to the server from the e-mail communication device. Thus, unnecessary signals are not communicated between the e-mail communication device and the server.

DETAILED DESCRIPTION OF THE PREFERRED EMBODIMENTS

Figure 1:
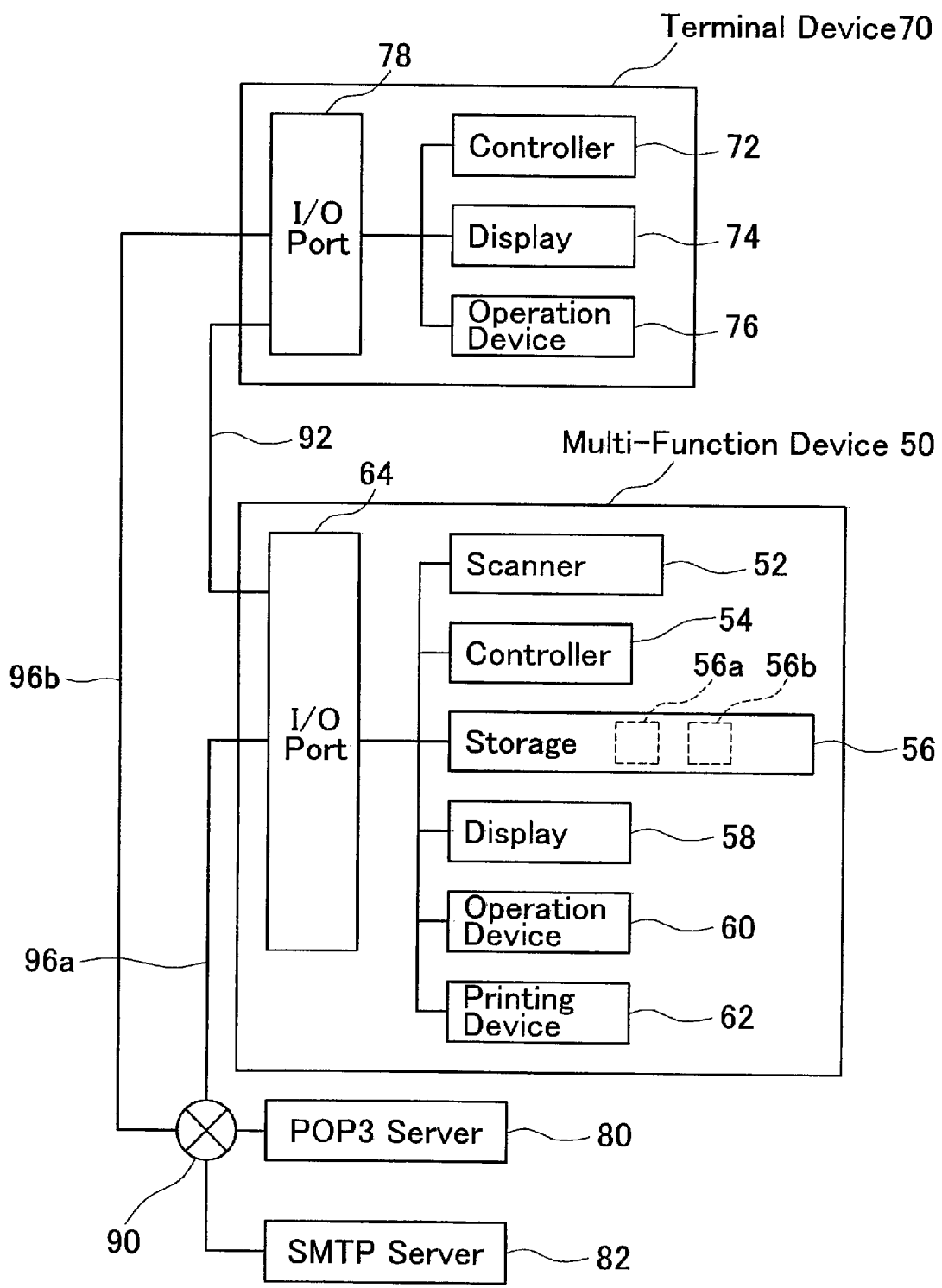
FIG. 1 is a view showing a network system according to an embodiment.

Before the embodiments will be described, a part of the technique set forth in the embodiments will be listed below.

The following methods (1) and (2) may be employed for obtaining the information indicating whether or not the e-mail communication through the server is enabled.

(1) The e-mail communication device may test, at a predetermined timing, whether or not the e-mail communication through the server is enabled by sending a signal for the test from the e-mail communication device to the server. There is a possibility that the e-mail communication device sends the signal for the test to the server while the e-mail communication through the server is disabled. The generally employed e-mail communication device is structured to communicate the connection establishing signal at every input of the communication command even in the state where the e-mail communication through the server is disabled. If the test frequency is less than that of the input of the communication command, the number of the unnecessary signals may be reduced.

(1-1) The user may be allowed to set the test frequency. In the case where the frequency of the input of the communication command to the e-mail communication device is high, the test frequency may also be set to a large value. In the case where the frequency of the input of the communication command to the e-mail communication system is low, the test frequency should be set to a small value. For example, if the e-mail communication device is shared by many terminal devices, the frequency of the input of the communication command to the e-mail communication device may be increased. The user may obtain the information with respect to the frequency of the input of the communication command to the e-mail communication device because the user can know the number of the terminal devices connected to the e-mail communication device. If the user is allowed to set the test frequency based on the frequency of the input of the communication command to the e-mail communication device, the test frequency may be made less than the input frequency of the communication command.

(1-2) The test may be regularly executed.

(1-3) The test may be irregularly executed. For example, the test may not be executed for the period for which the input frequency of the communication command is low (for example, during the night). The e-mail communication device may be structured to monitor the time elapsing from the input of the last communication command. In this case, if the communication command is not input even after the elapse of a predetermined time period, the e-mail communication device may be structured to inhibit the test until the input of the next communication command.

(1-4) The e-mail communication device may be programmed to determine the test frequency based on the input frequency of the communication command. For example, the e-mail communication device may count the number of the input of the communication command to determine the input frequency of the communication command. The e-mail communication device may execute the test with the frequency less than the determined frequency.

(1-5) The e-mail communication device may not execute the test during the period for which the storage stores the information indicating the communication enable state. Upon receiving the input of the communication command, the e-mail communication system executes the e-mail communication process. In the case where the e-mail communication is disabled resulting from the aforementioned communication process, the information indicating the communication disable state may be obtained. The information indicating the communication disable state may be stored in the storage. The e-mail communication device may execute the test, at a predetermined timing, during the period for which the storage stores the information indicating the communication disable state.

(2) The e-mail communication device may not test whether the e-mail communication through the server is enabled. The e-mail communication device may execute the email communication process in response to the input of the communication command. In the case where the e-mail communication fails through the communication process, the information indicating the communication disable state may be obtained. The information indicating the communication disable state may be stored in the storage. The server may be provided with the function for outputting a signal indicating that the server in the abnormal function state has restored to be in the normal function state (the signal will be referred to as a restoring signal). In response to the input of the restoring signal, the e-mail communication device is capable of obtaining the information indicating the communication enable state. The memory device may store the information indicating the communication enable state.

The aforementioned methods (1) and (2) are mere examples. The e-mail communication device is allowed to obtain, by using various methods, the information indicating whether or not the e-mail communication through the server is enabled.

The e-mail communication device may be a multi-function device to be used in connection with the internet. The multi-function device may include at least a scanner and a printer, and functions as an internet facsimile. The multi-function device may be connected to a plurality of terminal devices. The multi-function device may input e-mail communication commands (sending commands and/or receiving commands) output from the respective terminal device, and may execute the e-mail communication process (sending process and/or receiving process) in accordance with the e-mail communication command.

First Embodiment

A first embodiment will be described referring to the drawings. FIG. 1 schematically shows the structure of a network system 40. The network system 40 includes a multi-function device 50, a terminal device 70, a POP3 server 80 and an SMTP server 82.

(Structure of the Multi-Function Device)

The multi-function device 50 includes a scanner 52, a controller 54, a storage 56, a display 58, an operation device 60, a printing device 62, and an I/O port 64. The scanner 52 is provided with a CCD (Charge Coupled Device) or a CIS (Contact Image Sensor). The scanner 52 generates image data by scanning a document. The controller 54 is formed of a CPU and the like to control various process steps executed in the multi-function device 50. The storage 56 formed of a ROM, a RAM, an EEPROM and the like stores the program executed by the controller 54 and temporarily stores the data used in the process of execution of the program. The storage 56 of the embodiment includes a communication setting data storage area 56a and a temporary storage area 56b. The communication setting data storage area 56a stores the data used for e-mail communication. The specific explanation of the communication setting data will be described later in more detail. The temporary storage area 56b of the storage 56 is capable of temporarily storing various data. The temporary storage area 56b is capable of storing, for example, the image data scanned by the scanner 52, and storing the information indicating whether or not the e-mail communication through the servers 80, 82 is enabled. The display 58 formed of a liquid crystal display or the like is capable of displaying various data. The operation device 60 formed of a plurality of keys is operated by a user to input various information data to the multi-function device 50. The printing device 62 prints the image data generated by the scanner 52 on a printing medium. The multi-function device 50 is allowed to communicate e-mail, which will be described in more detail later. The printing device 62 is structured to print contents of the received e-mail on the printing medium.

The I/O port 64 is connected to an internet communication line 96a. The multi-function device 50 is connected to an internet 90 via the internet communication line 96a. The I/O port 64 is connected to a LAN communication line 92 which is connected to the terminal device 70. The multi-function device 50 and the terminal device 70 are connected via the LAN communication line 92. FIG. 1 shows only a single terminal device 70. However, a plurality of the terminal devices 70 is actually provided. The multi-function device 50 is connected to each terminal device 70 via the LAN communication line 92. Furthermore, each terminal device is also connected to the internet 90. Thus, the multi-function device 50 and the terminal devices 70 are connected in a communicable manner via the internet 90. The I/O port 64 is structured to input and output various data via the internet 90 or the LAN. The I/O port 64 is allowed to send or receive an e-mail, and is also allowed to input the command or the data output from the terminal devices 70 (for example, communication command) via the LAN.

(Structure of the Terminal Device)

The terminal device 70 includes a controller 72, a display 74, an operation device 76, and an I/O port 78. The controller 72 controls various processes executed by the terminal device 70. The display 74 is allowed to display various information data. The user is capable of inputting the various information data to the terminal device 70 by operating the operation device 76. The I/O port 78 is connected to the LAN communication line 92 and an internet communication line 96b. The LAN line 92 is connected to the multi-function device 50. The terminal device 70 is connected to the internet 90 via the internet communication line 96b. The I/O port 78 is structured to input/output various data via the internet 90 or the LAN. The I/O port 78 is structured to send or receive an e-mail, for example. The I/O port 78 is allowed to output commands and data (communication command, for example) to the multi-function device 50 via the LAN.

(Structure of the Servers)

The POP3 server 80 is connected to the internet 90. The POP3 server 80 is a server for receiving e-mails. The e-mail sent to the multi-function device 50 and the terminal device 70 is temporarily stored in the POP3 server 80. The multi-function device 50 and the terminal device 70 access the POP3 server 80 to receive the e-mail stored therein. The SMTP server 82 is connected to the internet 90. The SMTP server 82 is a server for sending e-mails. The multi-function device 50 and the terminal device 70 are allowed to send the e-mail through the SMTP server 82.

(Contents of Communication Setting Data)

Figure 2:
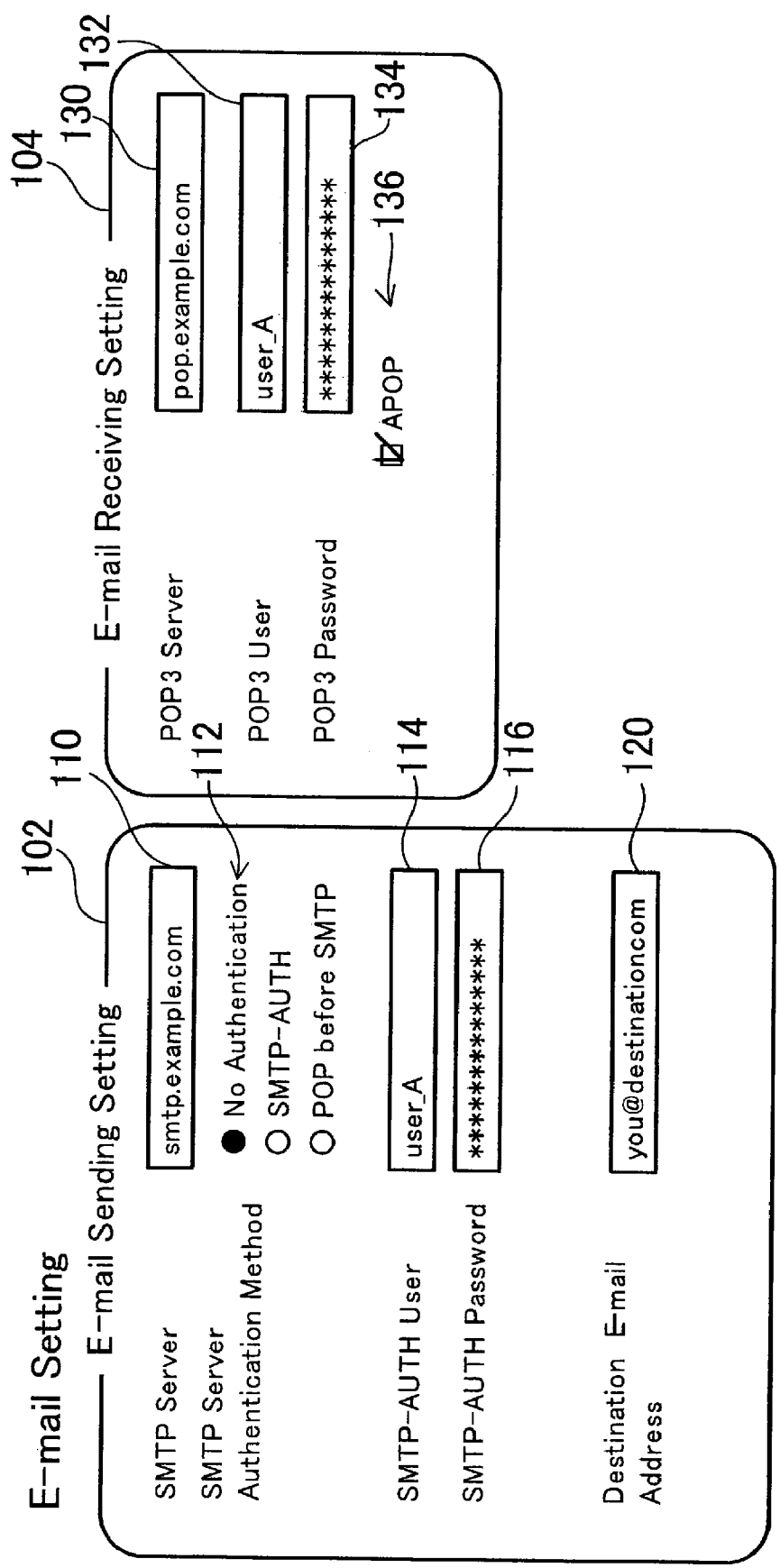
FIG. 2 is a view showing an example of communication setting data.

The contents of the communication setting data stored in the multi-function device 50 will be described. The user creates the communication setting data (sending setting data and receiving setting data) by the use of the terminal device 70. The user inputs the communication setting data by operating the operation device 76 (see FIG. 1). The explanation hereinafter will be made on the assumption that the communication setting data is created by the use of a mouse and a keyboard. The terminal device 70 is allowed to output the communication setting data to the multi-function device 50. The multi-function device 50 inputs the communication setting data which have been output from the terminal device 70 so as to be stored in the communication setting data storage area 56a. Referring to FIG. 2, the communication setting data will be described in detail. The communication setting data includes sending setting data 102 used for sending e-mail, and receiving setting data 104 used for receiving e-mail.

The sending setting data includes a plurality of items 110, 112, 114, 116 and 120. The item 110 denotes an address for identifying the SMTP server 82. The item 112 denotes the data for identifying the user authentication method of the SMTP server 82. The user authentication method of the SMTP server 82 is selected from "No authentication", "SMTP-AUTH", and "POP before SMTP". The items 114 and 116 are data to be input when the SMTP-AUTH is selected. The item 114 denotes the data for identifying the user name, and the item 116 denotes the password. The user name and the password are used when the SMTP server 82 executes the user authentication. The item 120 denotes the e-mail address of the destination to which a test mail is to be sent.

The receiving setting data includes a plurality of items 130, 132, 134 and 136. The item 130 denotes an address for identifying the POP3 server 80. The item 132 denotes data for identifying the user name. The item 134 denotes the password. The user name and the password are used when the POP3 server 80 executes the user authentication. The item 136 denotes data for identifying the user authentication method executed by the POP3 server 80. The user authentication method executed by the POP3 server 80 is selected from "POP3 authentication" and "APOP authentication". Clicking of the item 136 to be checked (state as shown in FIG. 2) indicates that the APOP authentication is selected. The blank state of the item 136 indicates that the POP3 authentication has been selected.

(Type of Processes Executed by Each Device)

Figure 3:
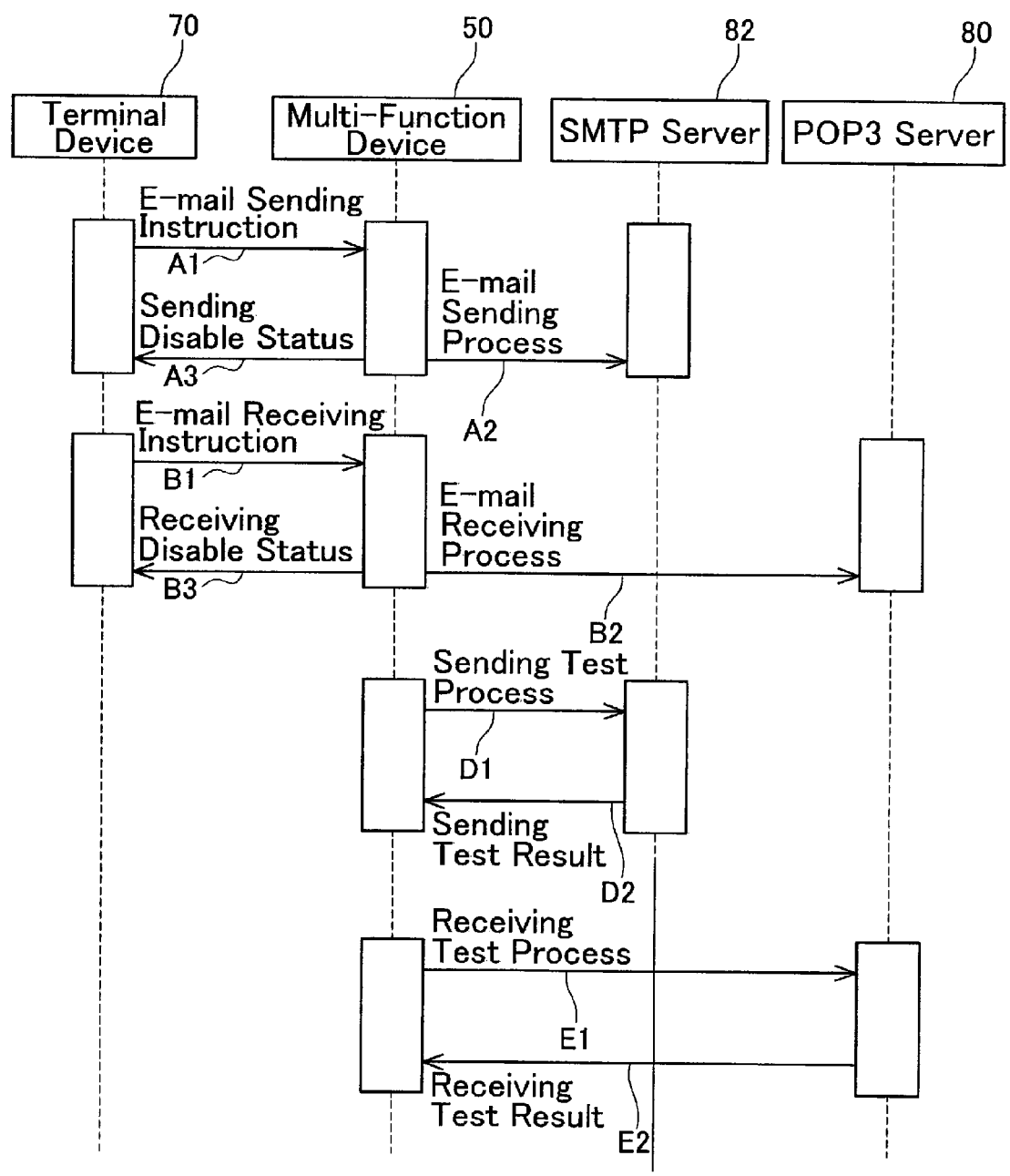
FIG. 3 is a view showing processes executed by respective devices.

The processes executed by the terminal device 70, the multi-function device 50, the SMTP server 82, and the POP3 server 80 will be briefly described hereinafter. FIG. 3 shows the processes executed by the respective devices 70, 50, 82 and 80. The terminal device 70 is allowed to output an e-mail sending instruction (sending command) to the multi-function device 50 (A1). The multi-function device 50 executes an e-mail sending process (A2) or a sending disable status report process (A3) in response to the input of the sending instruction. The determination with respect to which process is executed will be described later in more detail. In the e-mail sending process (A2), the multi-function device 50 establishes the TCP connection to the SMTP server 82. The multi-function device 50 outputs the user ID and the password etc. to the SMTP server 82. In the case where the user authentication by the SMTP-AUTH is required, the SMTP server 82 executes the user authentication by the use of the user ID and the password. When the user authentication of the SMTP server 82 succeeds, the multi-function device 50 outputs a body of the e-mail to the SMTP server 82. For example, the multi-function device 50 stores the image data scanned by the scanner 52 (see FIG. 1). The image data will be sent by e-mail. The multi-function device 50 is allowed to send the e-mail via the SMTP server 82 through the aforementioned process. In the case where the SMTP server 82 requires no user authentication of the SMTP-AUTH, the process of the user authentication of the SMTP server 82 will be skipped. In the case where the SMTP server 82 has no SMTP-AUTH function but has the POP before SMTP function, the user authentication is executed by the POP3 server 80. The user authentication as described above will be described later in more detail. In the sending disable status report process (A3), the multi-function device 50 outputs the information indicating the sending disable status to the terminal device 70. In the present embodiment, the aforementioned e-mail sending instruction is sent to the multi-function device 50 from the terminal device 70 via the LAN communication line 92 (see FIG. 1). The multi-function device 50 and the SMTP server 82 communicate signals and data through the internet communication line 96a.

The terminal device 70 is allowed to output the e-mail receiving instruction (receiving command) to the multi-function device 50 (B1). The multi-function device 50 executes an e-mail receiving process (B2) or a receiving disable status report process (B3) in response to the input of the receiving instruction. In the e-mail receiving process (B2), the multi-function device 50 establishes the TCP connection to the POP3 server 80, and outputs the user ID and the password thereto. The aforementioned process is the same as the e-mail sending process as described above. The POP3 server 80 temporarily stores the e-mail sent to the multi-function device 50. The POP3 server 80 sends the stored e-mail to the multi-function device 50 in response to the success of the user authentication. The multi-function device 50 allows the printing device 62 to print the contents of the e-mail. In the receiving disable status report process (B3), the multi-function device 50 outputs the information indicating the receiving disable status to the terminal device 70. In the present embodiment, the aforementioned e-mail receiving instruction is sent to the multi-function device 50 from the terminal device 70 via the LAN communication line 92 (see FIG. 1). The multi-function device 50 and the POP3 server 80 communicate signals and data through the internet communication line 96a.

The multi-function device 50 executes a sending test process (D1). The multi-function device 50 obtains a sending test result through the communication with the SMTP server 82 (D2). The sending test result is stored in the temporary storage area 56b (see FIG. 1). The detailed explanation with respect to the sending test process will be described later. The multi-function device 50 executes a receiving test process (E1). The multi-function device 50 obtains a receiving test result through the communication with the POP3 server 80 (E2). The receiving test result is stored in the temporary storage area 56b (see FIG. 1). The detailed explanation with respect to the receiving test process will be described later.

(Main Process of the Terminal Device)

Figure 4:
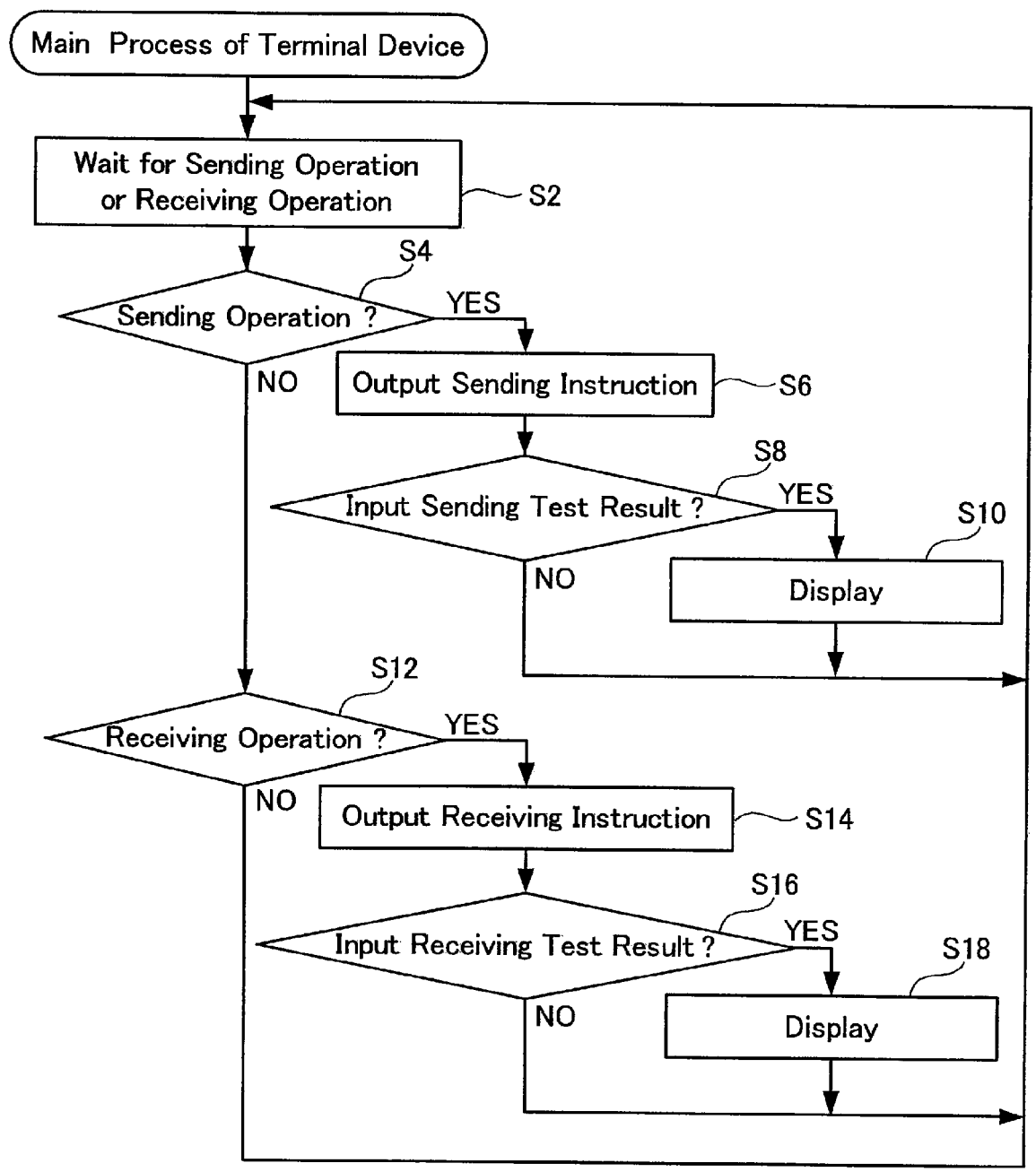
FIG. 4 is a flowchart of a main process of a terminal device.

The process executed by the terminal device 70 will be described in detail. The following process is executed by the controller 72 (see FIG. 1) of the terminal device 70. FIG. 4 is a flowchart of the main process of the terminal device 70. The user is allowed to input various information data by operating the operation device 76 (see FIG. 1). The terminal device 70 waits for an operation instructing sending the e-mail from the multi-function device 50 or an operation instructing receiving the e-mail by the multi-function device 50 (S2). The terminal device 70 monitors whether or not the operation instructing sending the e-mail has been executed (S4). If YES is obtained in S4, the terminal device 70 outputs the e-mail sending instruction (command) to the multi-function device 50 (S6). The aforementioned step corresponds to the process A1 shown in FIG. 3. As described above, there is a possibility that the multi-function device 50 outputs the information indicating the sending disable status to the terminal device 70 when the multi-function device 50 inputs the e-mail sending instruction (A3 shown in FIG. 3). The terminal device 70 monitors whether or not the information indicating the sending disable status (sending test result) has been input (S8). If YES is obtained, the terminal device 70 displays the sending test result on the display 74 (see FIG. 1) (S10). If NO is obtained in S8, the process returns to S2. The "NO" obtained in S8 means that the e-mail sending process (A2 shown in FIG. 3) is executed by the multi-function device 50.

The terminal device 70 monitors whether or not the operation instructing receiving the e-mail has been executed (S12). If YES is obtained in S12, the terminal device 70 outputs the e-mail receiving instruction to the multi-function device 50 (S14). The aforementioned step corresponds to the step B1 shown in FIG. 3. As described above, there is a possibility that the multi-function device 50 outputs the information indicating the receiving disable status to the terminal device 70 when the multi-function device 50 inputs the e-mail receiving instruction (B3 shown in FIG. 3). The terminal device 70 monitors whether or not the information indicating the receiving disable status (receiving test result) has been input (S16). If YES is obtained, the terminal device 70 displays the receiving test result on the display 74 (see FIG. 1). If NO is obtained in S16, the process returns to S2. The "NO" obtained in S16 means that the e-mail receiving process (B2 shown in FIG. 3) is executed by the multi-function device 50.

(Main Process of the Multi-Function Device)

Figure 5:
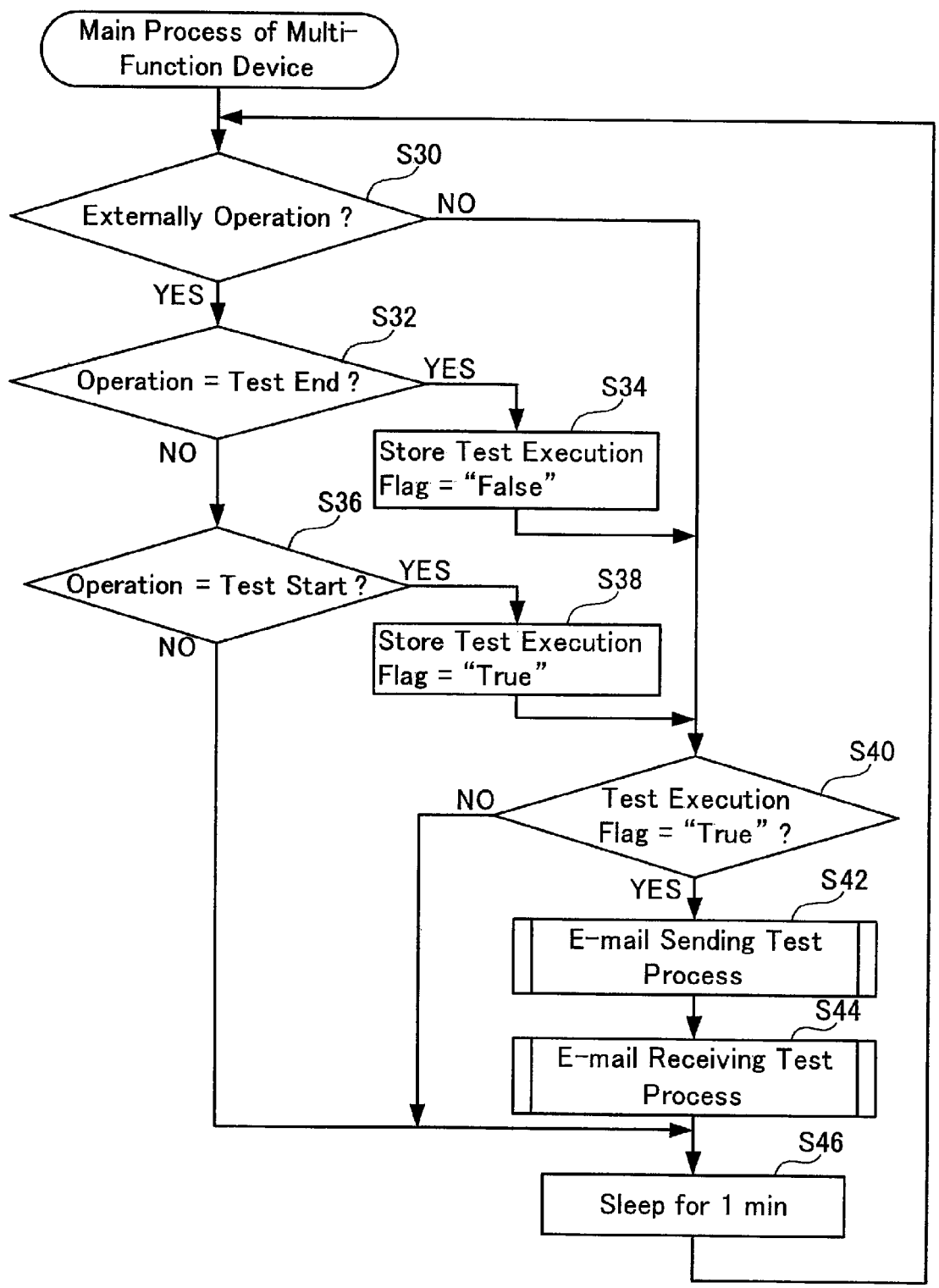
FIG. 5 is a flowchart of a main process of a multi-function device.

The main process of the multi-function device 50 will be described in detail. The following process will be executed by the controller 54 (see FIG. 1) of the multi-function device 50. FIG. 5 is a flowchart of the main process of the multi-function device 50. The user is allowed to input various information data into the multi-function device 50 by operating the operation device 60 (see FIG. 1) of the multi-function device 50. The multi-function device 50 monitors the user's operation of the operation device 60 (S30). If YES is obtained, the process proceeds to S32. If NO is obtained, the process proceeds to S40. The user is allowed to command such that the multi-function device 50 executes the test processes (S42, S44) to be described later by operating the operation device 60. The aforementioned command will be referred to as the "test execution command" hereinafter. The user is also allowed to command to inhibit the execution of the test processes (S42, S44) by operating the operation device 60. The aforementioned command will be referred to as the "test inhibition command". The multi-function device 50 determines whether or not the test inhibition command has been input (S32). If YES is obtained, the multi-function device 50 stores the "FALSE" information in a test execution flag (S34). The test execution flag is stored in the temporary storage area 56b. The process then proceeds to S40 subsequent to S34. If NO is obtained in S32, the multi-function device 50 determines whether or not the test execution command has been input (S36). If YES is obtained, the multi-function device 50 stores the "TRUE" information in the test execution flag (S38). The process proceeds to S40 subsequent to S38. If NO is obtained in S36, the multi-function device 50 executes another process in accordance with the user's operation, and the process proceeds to S46.

In S40, it is determined whether or not the test execution flag is set to "TRUE". If YES is obtained, the multi-function device 50 executes the e-mail sending test process (S42). When the sending test process ends, the multi-function device 50 executes the e-mail receiving test process (S44). The sending/receiving test processes will be described later in more detail. When the receiving test process ends, the process proceeds to S46. If NO is obtained in S40 (that is "FALSE" information is stored in the test execution flag), the process also proceeds to S46. The multi-function device 50 includes a timer which is built in the controller 54. In S46, the timer counts 1 minute. In other words, the multi-function device 50 is brought into a sleep state for 1 minute. After the elapse of the sleep period, the multi-function device 50 returns to S30.

(Sending Test Process of the Multi-Function Device)

Figure 6:
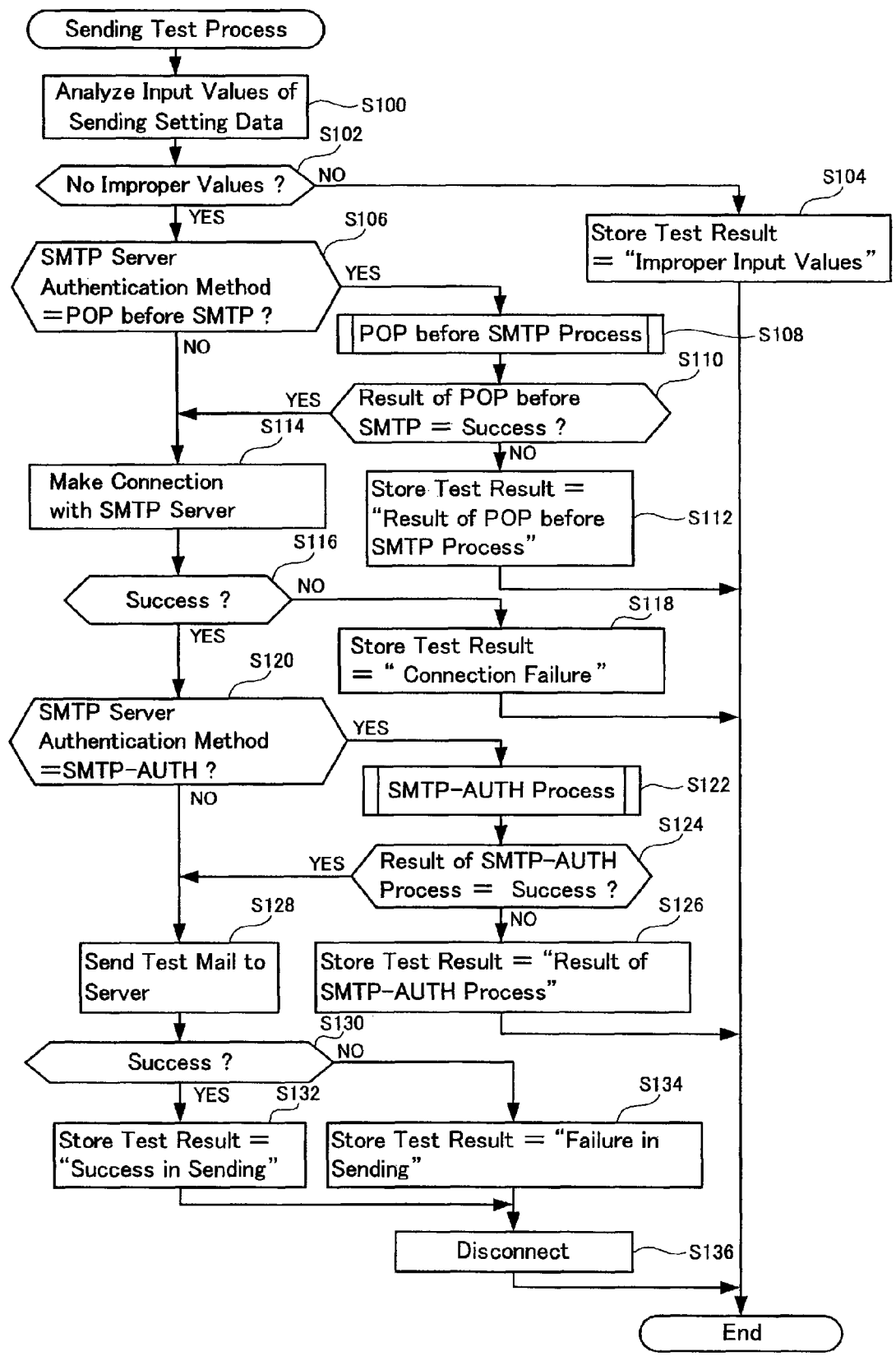
FIG. 6 is a flowchart of a sending test process.

The sending test process (S42 shown in FIG. 4) executed in the multi-function device 50 will be described in detail. FIG. 6 is a flowchart showing the sending test process. The multi-function device 50 analyzes the sending setting data stored in the communication setting data storage area 56a (S100). It is determined whether or not the improper input values exist in the sending setting data (S102). For example, if no data is input for the items 110, 112 and the like shown in FIG. 2, NO is obtained in S102. When NO is obtained in S102, the multi-function device 50 stores the information of "improper input values" as the sending test result (S104). This information is stored in the temporary storage area 56b. If YES is obtained in S102, the multi-function device 50 determines whether or not the authentication method contained in the sending setting data is "POP before SMTP" (S106). If the "POP before SMTP" has been selected in the item 112 shown in FIG. 2, YES is obtained in the aforementioned step. If YES is obtained in S106, the multi-function device 50 executes the POP before SMTP process (S108). The POP before SMTP will be simply referred to as the "PbS" hereinafter. If NO is obtained in S106, the process proceeds to S114.

The PbS authentication will be briefly described. The PbS authentication represents the user authentication executed through the POP3 server 80 in the case where the SMTP server 82 does not include the user authentication function. The database (hereinafter referred to as the common database) which is allowed to access both the SMTP server 82 and the POP3 server 80 is installed in the system 40 for the purpose of executing the PbS authentication. The multi-function device 50 first accesses the POP3 server 80. The multi-function device 50 outputs the receiving setting data (items 130, 132, 134, 136 shown in FIG. 2) stored in the communication setting data storage area 56a to the POP3 server 80. The POP3 server executes the user authentication based on the input receiving setting data. If the user authentication succeeds, the POP3 server 80 stores the information of the success in the user authentication with respect to the multi-function device 50 in the common database. After outputting the receiving setting data to the POP3 server 80, the multi-function device 50 accesses the SMTP server 82. That is, the multi-function device 50 outputs the information with respect to the e-mail sending instruction to the SMTP server 82. In this case, the SMTP server 82 accesses the common database to obtain the information indicating whether or not the user authentication has succeeded with respect to the multi-function device 50. If the user authentication succeeds with respect to the multi-function device 50, the SMTP server 82 authorizes the e-mail sending.

Figure 7:
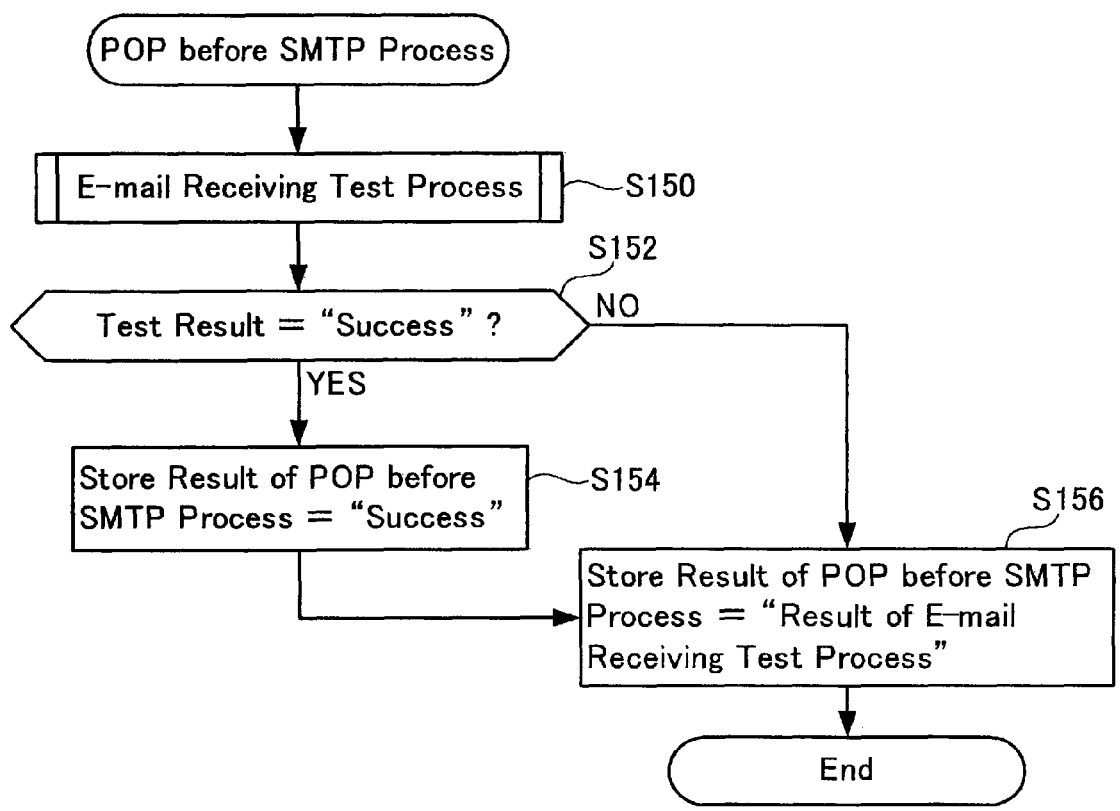
FIG. 7 is a flowchart of a POP before SMTP process.

FIG. 7 is a flowchart of the PbS process. In the PbS process, the e-mail receiving test is conducted (S150). In the receiving test process, the user authentication is executed by the POP3 server 80 by the use of the receiving setting data stored in the communication setting data storage area 56a. The contents of the receiving test process will be described later in more detail. The receiving test result is obtained from execution of the receiving test process. The receiving test result is stored in the temporary storage area 56b. The multi-function device 50 determines whether or not the receiving test result indicates "success" (S152). If YES is obtained, the information "success" is stored as the PbS process result. This information is stored in the temporary storage area 56b. Meanwhile, NO obtained in S152 represents the failure in the receiving test process. Although the detailed explanation will be given later, the cause of the failure in the receiving test process is stored. If NO is obtained in S152, the receiving test result (cause of the failure) is stored as the PbS process result (S156). The receiving test result is stored in the temporary storage area 56b.

After the end of the PbS process (S108) shown in FIG. 6, it is determined whether or not the Pbs process result indicates "success" (S110). If NO is obtained, the multi-function device 50 stores the PbS process result (cause of the failure) as the sending test result (S112). The PbS process result is stored in the temporary storage area 56b. If YES is obtained in S110, the process proceeds to S114. In S114, the multi-function device 50 accesses the SMTP server 82 to attempt the TCP connection thereto. If the attempt succeeds, YES is determined in S116. If YES is obtained in S116, the process proceeds to S120. Meanwhile, if the SMTP server 82 functions abnormally (for example, failing to return the SYN/ACK signal), NO is determined in S116. When NO is obtained in S16, the multi-function device 50 stores the information "SMTP server connection failure" as the sending test result (S118). The information is stored in the temporary storage area 56b. If YES is obtained in S116, the multi-function device 50 determines whether or not the authentication method contained in the sending setting data is "SMTP-AUTH" (S120). If the "SMTP-AUTH" has been selected in the item 112 shown in FIG. 2, YES is determined in the step. If YES is obtained in S120, the multi-function device 50 executes the SMTP-AUTH process (S122).

The explanation with respect to the SMTP-AUTH will be briefly made. As described above, some kind of the SMTP server is not provided with the user authentication function, and some is provided with the user authentication function. The user authentication performed through the SMTP server is referred to as SMTP-AUTH. The SMTP server authorizes the e-mail sending in response to the success in the user authentication. The user authentication is performed through SMTP-AUTH by the use of the user name and the password (the items 114, 116 shown in FIG. 2) contained in the sending setting data. The multi-function device 50 outputs the user name and the password to the SMTP server 82. User names and passwords that the SMTP server 82 authorizes the e-mail sending are registered in the SMTP server 82. When the user name and the password output from the multi-function device 50 are registered in the SMTP server 82, the SMTP server 82 authorizes the e-mail sending from the multi-function device 50 via the SMTP server 82.

It is well known that there are a plurality of kinds of user authentication methods such as "PLAIN", "LOGIN", and "CRAM-MD5". They are referred to as authentication mechanisms. Some kind of the SMTP server is capable of executing a plurality of authentication mechanisms, and some is capable of executing only one authentication mechanism. In the CRAM-MD5, the password output from the multi-function device 50 to the SMTP server 82 is encrypted. In the PLAIN and LOGIN, the password is not encrypted. In the PLAIN, the user name and the password are sent to the SMTP server 82 simultaneously. In the LOGIN, the user name is sent to the SMTP server 82 first, and the password is sent to the SMTP server 82 when the user name is registered therein. As the CRAM-MD5 encrypts the password, the security level is the highest. The security level of the LOGIN is the second highest, and the security level of the PLAIN is the lowest.

Figure 8:
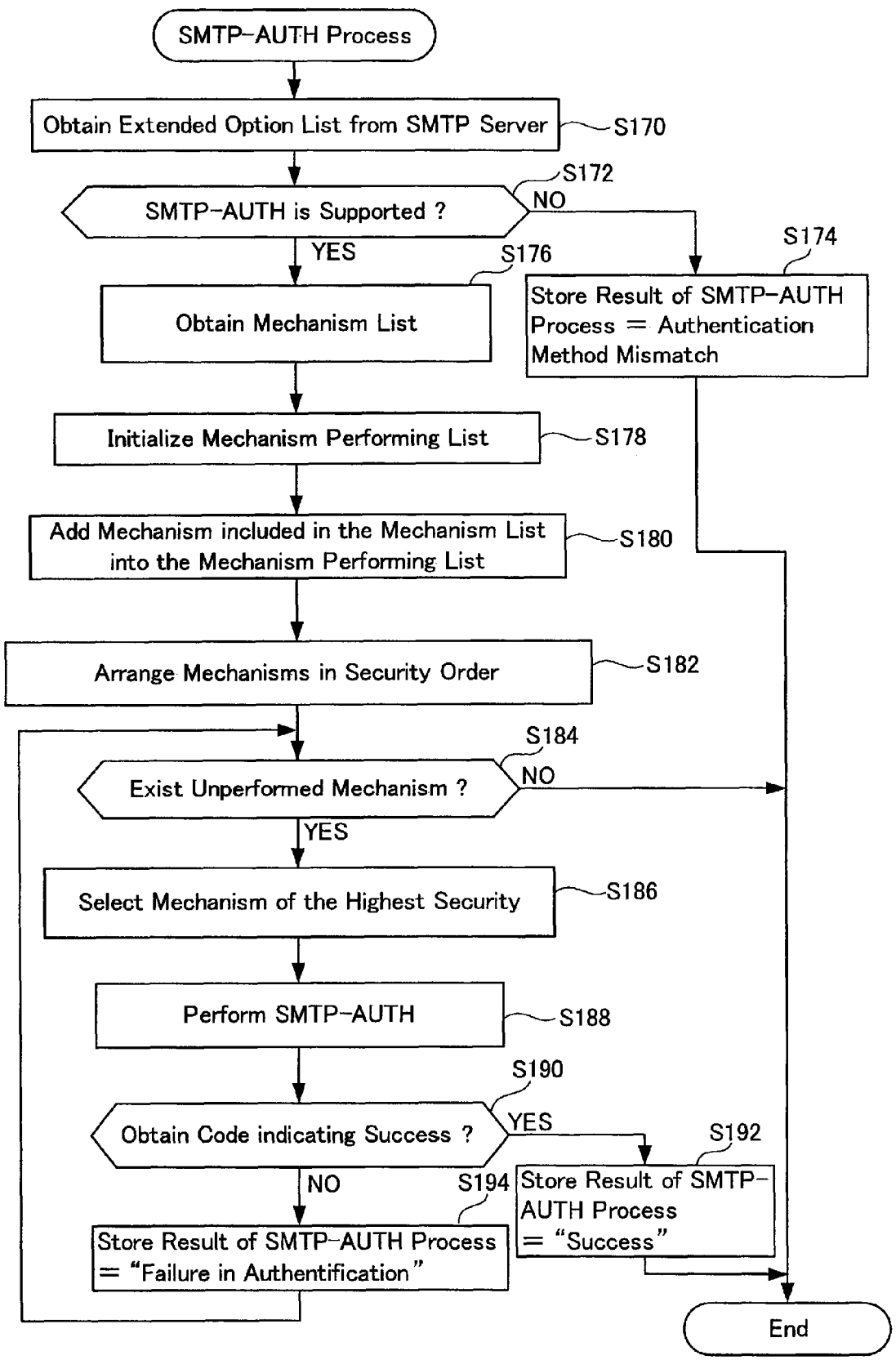
FIG. 8 is a flowchart of a SMTP-AUTH process.

FIG. 8 is a flowchart of the SMTP-AUTH process. The multi-function device 50 outputs an EHLO command to the SMTP server 82 to obtain an extended option list of ESMTP (S170). In S170, various information data are communicated between the multi-function device 50 and the SMTP server 82. For example, in the case where the SMTP server 82 is provided with the function for executing the SMTP-AUTH, the SMTP server 82 outputs the list of the authentication mechanisms to be executed thereby to the multi-function device 50. The multi-function device 50 determines whether or not the SMTP server 82 supports SMTP-AUTH (S172). If NO is obtained, the multi-function device 50 stores the information "SMTP server authentication method mismatch" as the result of the SMTP-AUTH process (S174). This information is stored in the temporary storage area 56b. When YES is obtained in S172, the multi-function device 50 obtains the list of the authentication mechanisms which may be executed by the SMTP server 82 (S176). Then the multi-function device 50 initializes an authentication mechanism performing list (S178). This list has been stored in the temporary storage area 56b. In S178, the previously obtained list is deleted. The multi-function device 50 identifies the authentication mechanism(s) which can be executed thereby among the authentication mechanism(s) obtained in S176. The multi-function device 50 stores the identified authentication mechanism(s) into the authentication mechanism performing list (S180). That is, the identified authentication mechanism(s) is stored in the temporary storage area 56b, and then the multi-function device 50 rearranges the authentication mechanism(s) stored in the authentication mechanism performing list in the order from the highest security level (S182). For example, in the case where the authentication mechanism performing list contains the PLAIN, LOGIN, and CRAM-MD5, the CRAM-MD5, LOGIN, and PLAIN are rearranged in the order.

The multi-function device 50 determines whether or not the authentication mechanism performing list contains the authentication mechanism that has not been used for the user authentication (S184). In other words, it is determined whether or not the authentication mechanism exists that has not been executed in the process in S188 to be described later. If YES is obtained, the multi-function device 50 selects the authentication mechanism with the highest security level from the authentication mechanism(s) that has not been executed (S186). In the aforementioned example, the CRAM-MD5 is selected. The multi-function device 50 outputs the user name and the password (items 114, 116 shown in FIG. 2) contained in the sending setting data to the SMTP server 82 using the authentication mechanism selected in S186. In this way, the SMTP server 82 executes SMTP-AUTH (S188). The SMTP server 82 outputs the result of the SMTP-AUTH to the multi-function device 50. The multi-function device 50 monitors whether or not a code indicating the success in the SMTP-AUTH has been input (S190). If YES is obtained, the multi-function device 50 stores the information "success" as the SMTP-AUTH process result (S192). This information is stored in the temporary storage area 56b. Then the multi-function device 50 ends the SMTP-AUTH process. Meanwhile, if NO is obtained in S190, the multi-function device 50 stores the information "failure in SMTP server authentication" as the SMTP-AUTH process result (S194). This information is stored in the temporary storage area 56b. Then the multi-function device 50 returns to S184 where it is determined whether or not another authentication mechanism which has not been executed yet exists. When the SMTP-AUTH executed with the other authentication mechanism is successful (YES in S190), the SMTP-AUTH process result stored as the "failure in SMTP server authentication" with respect to the authentication mechanism with the higher security level is updated to the information "success" (S192).

When the SMTP-AUTH process (S122) shown in FIG. 6 ends, it is determined whether or not the SMTP-AUTH process results is "success" (S124). If NO is obtained, the multi-function device 50 stores the SMTP-AUTH process result ("SMTP server authentication method mismatch" or "failure in SMTP server authentication") as the sending test result (S126). That is, the cause of the failure is stored as the sending test result. The sending test result is stored in the temporary storage area 56b. If NO is obtained in S120, or YES is obtained in S124, the multi-function device 50 executes the process in S128. NO in S120 indicates that the "no authentication" has selected in the item 112 shown in FIG. 2. In this case, the user authentication with respect to the e-mail sending is not executed. In S128, the test mail transmission is attempted. As shown in FIG. 2, the sending setting data contains the mail address of the destination of the item 120. The test mail is attempted to be sent to the mail address via the SMTP server 82. The SMTP server 82 outputs a code indicating the success or failure in the test mail transmission to the multi-function device 50. The multi-function device 50 monitors whether or not the test mail transmission is successful (S130). When the code indicating the success is input, the multi-function device 50 determines YES, and when the code indicating the failure is input, the multi-function device 50 determines NO. If YES is obtained in S130, the multi-function device 50 stores the information "success in sending" as the sending test result (S132). Meanwhile, when NO is obtained in S130, the multi-function device 50 stores the information "failure in sending" as the sending test result (S134). Those sending test results are stored in the temporary storage area 56b. The multi-function device 50 executes the process in S132 or S134, and then disconnects the connection to the SMTP server 82.

(Receiving Test Process of the Multi-Function Device).

Figure 9:
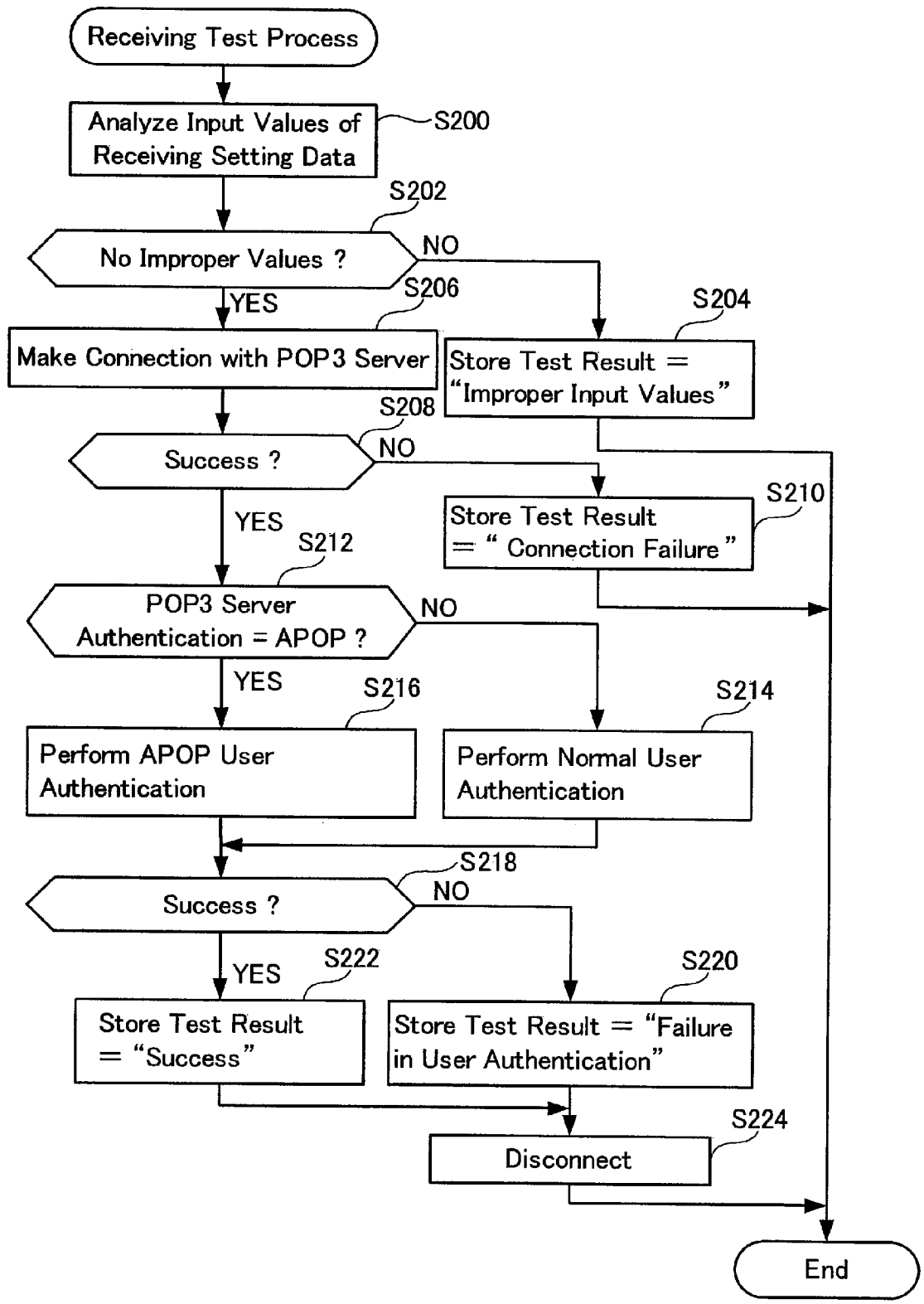
FIG. 9 is a flowchart of a receiving test process.

The receiving test process (S44 shown in FIG. 5) executed by the multi-function device 50 will be described in detail. FIG. 9 is a flowchart of the receiving test process. The multi-function device 50 analyzes the receiving setting data stored in the communication setting data storage area 56a (S200). It is determined whether or not the improper input values exist in the receiving setting data (S202). If NO is obtained in S202, the multi-function device 50 stores the information "improper input values" as the receiving test result (S204). This information is stored in the temporary storage area 56b. If YES is obtained in S202, the process proceeds to S206. In S206, the multi-function device 50 accesses the POP3 server 80. The multi-function device 50 attempts the TCP connection to the POP3 server 80. If the attempt is successful, YES is determined in S208. If YES is obtained in S208, the process proceeds to S212. Meanwhile, if the POP3 server 80 abnormally functions (for example, failing to return the SYN/ACK signal), NO is determined in S208. When NO is obtained in S208, the multi-function device 50 stores the information "POP3 server connection failure" as the receiving test result (S210). This information is stored in the temporary storage area 56b. If YES is obtained in S208, the multi-function device 50 determines whether or not the authentication method contained in the receiving setting data is "APOP" (S212). When the "APOP" has selected is the item 136 shown in FIG. 2, YES is determined in the aforementioned step. When the "APOP" has not been selected, NO is determined. When NO is obtained in S212, the multi-function device 50 executes the normal POP3 authentication process (S214). Meanwhile, if YES is obtained in S212, the multi-function device 50 executes the APOP authentication process (S216).

The user authentication through the POP3 server will be briefly described. The POP3 server 80 executes the user authentication using the user name and the password (items 132, 134 shown in FIG. 2) contained in the receiving setting data. The multi-function device 50 outputs the user name and the password to the POP3 server 80. User names and passwords that the e-mail receiving is authorized are registered in the POP3 server 80. In the case where the user name and the password output from the multi-function device 50 are registered in the POP3 server 80, the POP3 server 80 authorizes the multi-function device 50 to receive the e-mail. Some kind of the POP3 server executes the normal POP3 authentication and the APOP authentication, and some executes only the normal POP3 authentication. In the APOP authentication, the password output from the multi-function device 50 to the POP3 server 80 is encrypted. Accordingly, the APOP authentication method is higher security level. In the normal POP3 authentication, the password is not encrypted.

In S214, the multi-function device 50 outputs the user name and the password contained in the receiving setting data to the POP3 server 80. In this case, the password is not encrypted. In the case where the user name and the password are registered in the POP3 server 80, the POP3 server 80 outputs a code indicating the user authentication success to the multi-function device 50. In the case where at least one of the user name and the password is not registered in the POP3 server 80, the POP3 server 80 outputs a code indicating the failure in the user authentication to the multi-function device 50. In the case where the code indicating the user authentication success is input, the multi-function device 50 determines YES in S218. In the case where the code indicating the user authentication failure is input, the multi-function device 50 determines NO in S218. In S216, the multi-function device 50 outputs the user name and the password contained in the receiving setting data to the POP3 server 80. The password is encrypted. In the case where the APOP authentication cannot be executed (POP3 authentication can only be executed), the POP3 server 80 outputs an error code to the multi-function device 50. When the error code is input, the multi-function device 50 determines NO in S218. In the case where the user name and the password are registered in the POP3 server 80, the POP3 server 80 outputs the code indicating the user authentication success to the multi-function device 50. In the case where at least one of the user name and the password is not registered in the POP3 server, the POP3 server 80 outputs the code indicating the user authentication failure to the multi-function device 50. When the code indicating the success in the user authentication is input, the multi-function device 50 determines YES in S218. When the code indicating the user authentication failure is input, the multi-function device 50 determines NO in S218. If NO is obtained in S218, the multi-function device 50 stores the information "failure in user authentication" as the receiving test result (S220). Meanwhile, if YES is obtained in S218, the multi-function device 50 stores the information "success" as the receiving test result (S222). The receiving test result is stored in the temporary storage area 56b. Then the multi-function device 50 disconnects the connection to the POP3 server 80.

(Status Sending Process of the Multi-Function Device)

Figure 10:
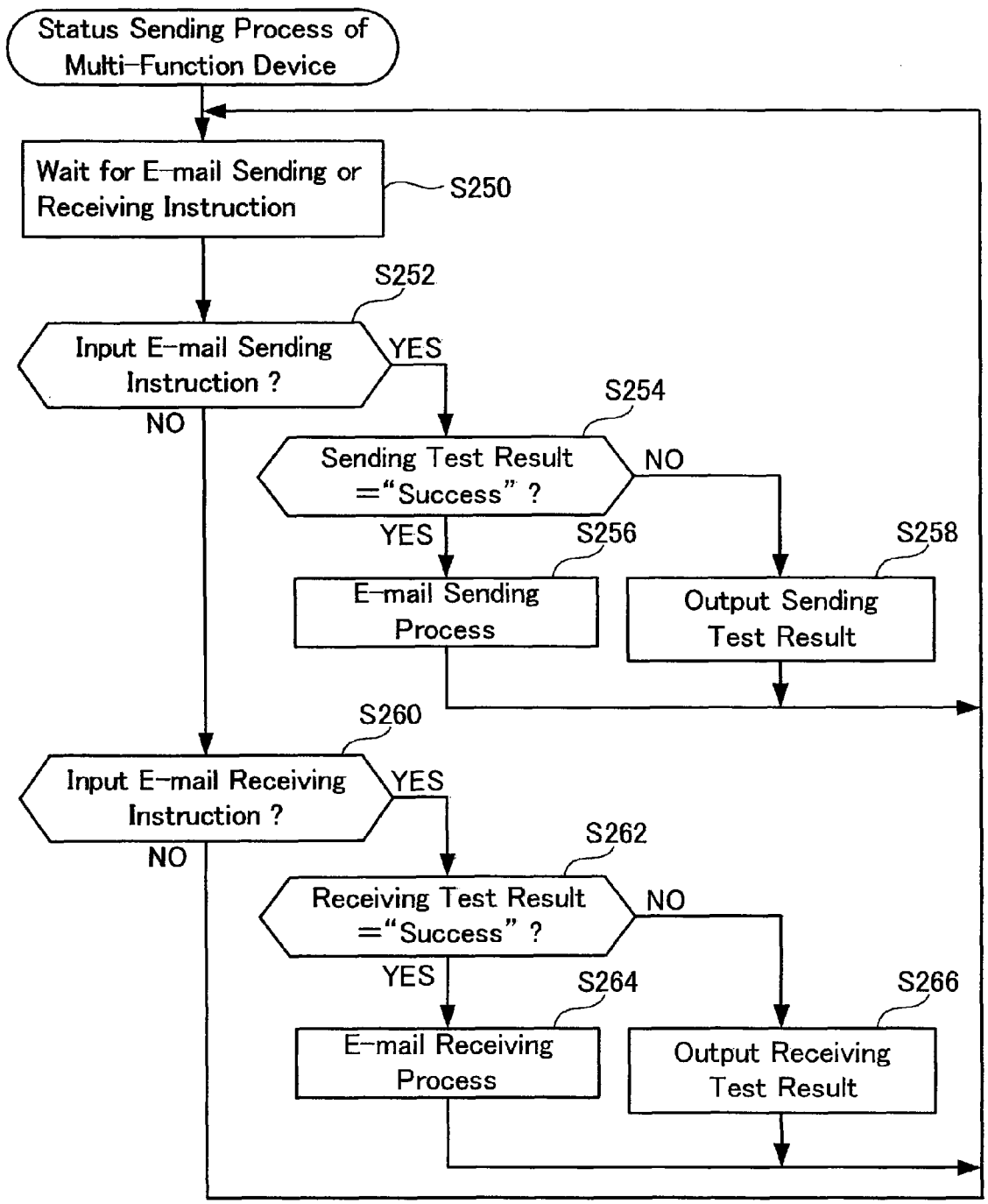
FIG. 10 is a flowchart of a status sending process of the multi-function device.

The status sending process executed by the multi-function device 50 will be described. As described above, the multi-function device 50 periodically executes the sending test process (S42) and the receiving test process (S44), and stores the test results in the temporary storage area 56b. The test results are used for the status sending process. FIG. 10 is a flowchart of the status sending process. The multi-function device 50 is in a stand-by state until the e-mail sending or receiving instruction (command) is input. Such instruction is output from the terminal device 70 in S6 or S14 shown in FIG. 4. When the e-mail communication instruction is input (YES in S252), the multi-function device 50 determines whether or not the sending test result indicates the success (S254). In the case where the information "success" is stored in the temporary storage area 56b as the sending test result, YES is determined in the aforementioned step. In the case where the other information (cause of the failure) is stored as the sending test result, NO is determined.

When YES is obtained in S254, the multi-function device 50 executes the e-mail sending process (S256). For example, the multi-function device 50 stores the image data scanned by the scanner 52 (see FIG. 1). The image data is sent by e-mail. The destination to which the e-mail is sent may be preliminarily set in the multi-function device 50, or contained in the e-mail sending instruction output from the terminal device 70. Step in S256 corresponds to the process A2 shown in FIG. 3. The multi-function device 50 executes the e-mail sending process using the sending setting data stored in the communication setting data storage area 56a. The multi-function device 50 establishes the TCP connection to the SMTP server 82. Then the multi-function device 50 outputs the data with respect to the user authentication. For example, in the case where the PbS authentication is selected, the multi-function device 50 outputs the user name and the password (items 132, 134 shown in FIG. 2) contained in the receiving setting data to the POP3 server 80. For example, in the case where the SMTP-AUTH is selected, the multi-function device 50 outputs the user name and the password (items 114, 116 shown in FIG. 2) contained in the sending setting data to the SMTP server 82. When the user authentication is successful, the multi-function device 50 sends the e-mail to the SMTP server 82. In the case where the non-execution of the user authentication is selected, the multi-function device 50 sends the e-mail to the SMTP server 82 without outputting the data with respect to the user authentication.

NO in S254 indicates the failure in the sending test result. In this case, the multi-function device 50 outputs the sending test result to the terminal device 70 which output the sending instruction (S258). The step in S258 corresponds to the process A3 shown in FIG. 3. The sending test result is stored in the temporary storage area 56b. In S258, the cause of the failure in the sending test result is output. That is, any one of the information data including "improper input values" (S104), "PbS process result (cause of the failure)" (S112), "SMTP server connection failure" (S118), "SMTP server authentication method mismatch" (S174), "Failure in authentication" (S194), and "Failure in sending" (S134) will be output. As described above, when the sending test result is input, the terminal device 70 displays the sending test result (S10 shown in FIG. 4). The user is thus informed that the e-mail cannot be transmitted. As the user is allowed to identify the cause of the failure, the action for eliminating the cause may be taken.

In the case where the e-mail receiving instruction is input (YES in S260), the multi-function device 50 determines whether or not the receiving test result is successful (S262). In the case where the information "success" is stored in the temporary storage area 56b as the receiving test result, YES is determined in this step. In the case where the other information (cause of the failure) is stored as the receiving test result, NO is determined. If YES is obtained in S262, the multi-function device 50 executes the e-mail receiving process (S264). The multi-function device 50 executes the e-mail receiving process using the receiving setting data stored in the communication setting data storage area 56a. The multi-function device 50 accesses the POP3 server 80 to receive the e-mail stored therein. The step in S264 corresponds to the process B2 shown in FIG. 3. The multi-function device 50 establishes the TCP connection to the POP3 server 80, and then outputs the data with respect to the user authentication. Then, the multi-function device 50 outputs the user name and the password (items 132, 134 shown in FIG. 2) contained in the receiving setting data to the POP3 server 80. When the user authentication is successful, the POP3 server 80 sends the e-mail to the multi-function device 50. The multi-function device 50 allows the printing device 62 (see FIG. 1) to print the content of the received e-mail.

NO in S262 indicates the failure in the receiving test result. In this case, the multi-function device 50 outputs the receiving test result to the terminal device 70 which output the receiving instruction (S266). The step in S266 corresponds to the process B3 shown in FIG. 3. The receiving test result is stored in the temporary storage area 56b. In S266, the cause of the failure in the receiving test result is output. That is, any one of the information data including "improper input values" (S204), "POP3 server connection failure" (S210) and "failure in user authentication" (S220) will be output. The terminal device 70 displays the receiving test result when the receiving test result is input (S18 shown in FIG. 4). The user is thus informed that the e-mail cannot be received. As the user is allowed to identify the cause of the failure, the action for eliminating the cause may be taken.

In the state where the e-mail communication is disabled through the POP3 server 80 and the SMTP server 82, the multi-function device 50 does not execute the TCP connection to the servers 80, 82 irrespective of the input of the e-mail communication instruction (receiving or sending instruction). That is, the multi-function device 50 does not output the signal required for the TCP connection (for example, SYN signal or ACK signal) to the servers 80, 82. The multi-function device 50 does not output the data with respect to the user authentication to the servers 80, 82. In the embodiment, no unnecessary signal is communicated between the multi-function device 50 and the servers 80, 82. Therefore, the communication load between the multi-function device 50 and the servers 80, 82 is expected to be reduced.

Second Embodiment

A second embodiment is different from the first embodiment in the main process executed by the terminal device 70 and the main process executed by the multi-function device 50, respectively.

(Main Process of the Terminal Device)

Figure 11:
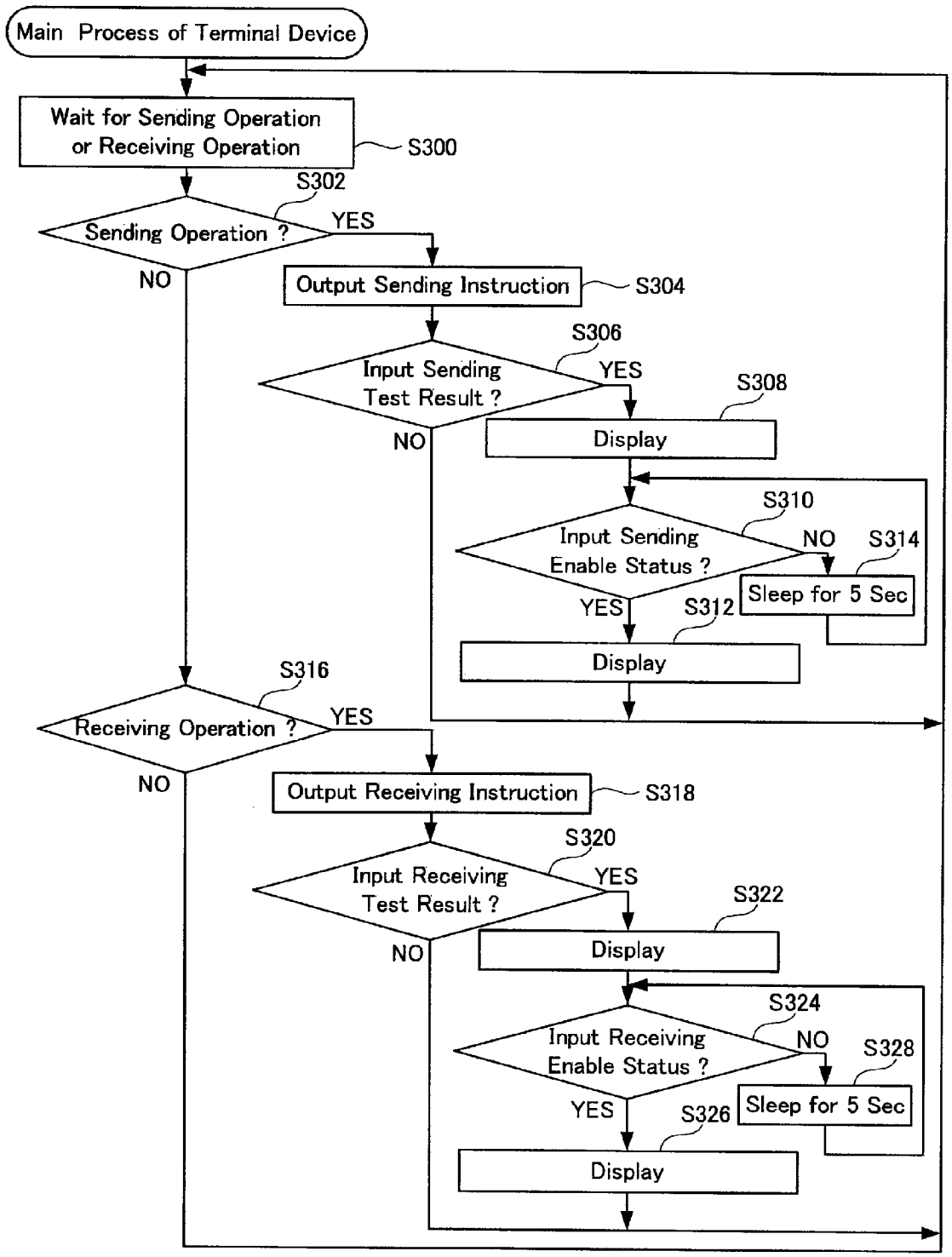
FIG. 11 is a flowchart of a main process of the terminal device (second embodiment).

FIG. 11 is a flowchart of the main process of the terminal device 70 according to the second embodiment. The processes in S300 to S308 shown in FIG. 11 are the same as those in S2 to S10 shown in FIG. 4. The explanation with respect to the processes from S300 to S308, thus, will be omitted. The terminal device 70 determines whether or not a sending enable status has been input after displaying the sending test result (S310). The sending enable status is output from the multi-function device 50. The explanation as to how the sending enable status is output from the multi-function device 50 will be described later in detail. In the case where the sending enable status is input (YES in S310), the terminal device 70 displays a sending enable message (S312). Meanwhile, in the case where the sending enable status is not input (NO in S310), the terminal device 70 is brought into a sleep state for 5 seconds (S314). After the elapse of 5 seconds in the sleep state, the terminal device 70 allows the process to proceed to S310.

The process steps in S316 to S322 shown in FIG. 11 are the same as those in S12 to S18 shown in FIG. 4. The explanation with respect to the processes from S316 to S322, thus, will be omitted. The terminal device 70 determines whether or not a receiving enable status has been input after displaying the receiving test result (S324). The receiving enable status is output from the multi-function device 50. The explanation as to how the receiving enable status is output from the multi-function device 50 will be described later in detail. In the case where the receiving enable status is input (YES in S324), the terminal device 70 displays a receiving enable message (S326). Meanwhile, in the case where the receiving enable status is not input (NO in S324), the terminal device 70 is brought into a sleep state for 5 seconds (S328). After the elapse of 5 seconds in the sleep state, the terminal device 70 allows the process to proceed to S324.

In the case where the e-mail sending instruction is input while the information indicating the failure in the sending test result is stored in the temporary storage area 56b (NO in S254 shown in FIG. 10), the multi-function device 50 stores the ID for identifying the terminal device 70 which output the sending instruction. The ID of the terminal device is stored in the temporary storage area 56b. In the case where the e-mail receiving instruction is input while the information indicating the failure in the receiving test result is stored in the temporary storage area 56b (NO in S262 shown in FIG. 10), the multi-function device 50 stores the ID for identifying the terminal device 70 which output the receiving instruction. The ID of the terminal device stored in the temporary storage area 56b is used for the main process of the multi-function device 50 to be described below.

(Main Process of the Multi-Function Device)

Figure 12:
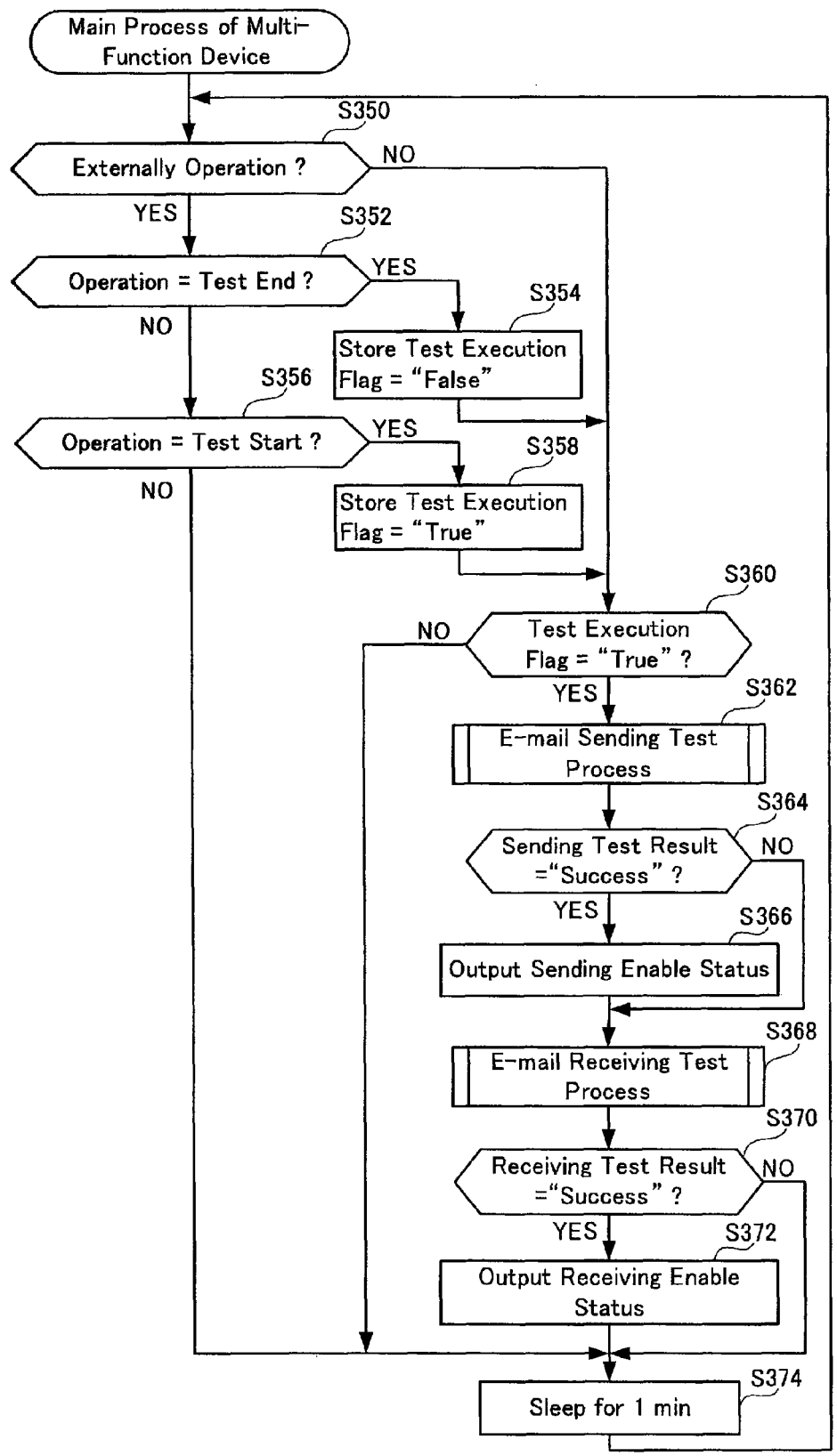
FIG. 12 is a flowchart of a main process of the multi-function device.

FIG. 12 is a flowchart of the main process of the multi-function device. The processes in S350 to S360 shown in FIG. 12 are the same as those in S30 to S40 shown in FIG. 5. The explanation with respect to the processes from S350 to S360, thus, will be omitted. If YES is obtained in S360, the multi-function device 50 executes the e-mail sending test process (S362). This step corresponds to the step S42 shown in FIG. 5. The multi-function device 50 determines whether or not the sending test result is successful (S264). If YES is obtained, the multi-function device 50 identifies the ID of the terminal device 70 which output the sending instruction while the information of the failure in the sending test result is stored in the temporary storage area 56b. The ID is stored in the temporary storage area 56b. Then, the multi-function device 50 outputs the sending enable status to the terminal device 70 having the identified ID (S366). The sending enable status may be output to the terminal device 70 to which the e-mail cannot be sent in spite of the output of the sending instruction. The sending enable status contains the information which indicates that the e-mal sending is enabled. As described above, the terminal device 70 displays the content of the sending enable status (see S312 shown in FIG. 11). The user is thus informed that the e-mail sending is enabled. In the case where there is no terminal device which output the sending instruction while the information of the failure in the sending test result is stored in the temporary storage area 56b, the process of S366 is skipped.

If NO is obtained in S364, or the process in S366 is finished, the multi-function device 50 executes the e-mail receiving test process (S368). The step is identical to that of S44 shown in FIG. 5. The multi-function device 50 determines whether or not the receiving test result is successful (S370). If YES is obtained, the multi-function device 50 identifies the ID of the terminal device 70 which output the receiving instruction while the information of the failure in the receiving test result is stored in the temporary storage area 56b. The ID is stored in the temporary storage area 56b. Then, the multi-function device 50 outputs the receiving enable status to the terminal device 70 having the identified ID (S372). Thus, the receiving enable status is output to the terminal device 70 which cannot receive the e-mail although the receiving instruction is output. The receiving enable status contains the information indicating that the e-mail receiving is enabled. As described above, the terminal device 70 displays the content of the receiving enable status (see S326 shown in FIG. 11). The user is thus informed that the e-mail receiving is enabled. In the case where there is no terminal device which output the receiving instruction while the information of the failure in the receiving test result is stored in the temporary storage area 56b, the process in S372 is skipped. The multi-function device 50 is brought into a sleep state for 1 minute in S374 in the same way as in the first embodiment (S46 shown in FIG. 5).

Third Embodiment

In the second embodiment, the multi-function device 50 outputs the sending enable status or the receiving enable status to the terminal device 70 (see S366, S372 shown in FIG. 12). The user of the terminal device 70 is required to perform the operation for outputting the sending instruction or the receiving instruction to the multi-function device 50 again after checking the sending enable message or the receiving enable message. In the case where the e-mail sending instruction is input while the information of the failure in the sending test result is stored in the temporary storage area 56b, and thereafter the sending test result has changed to be successful, the multi-function device 50 according to the present embodiment automatically executes the sending process in accordance with the sending instruction. In the case where the e-mail receiving instruction is input while the information of the failure in the receiving test result is stored in the temporary storage area 56b, and thereafter the receiving test result has changed to be successful, the multi-function device 50 according to the present embodiment automatically executes the receiving process in accordance with the receiving instruction.

(Main Process of the Terminal Device)

Figure 13:
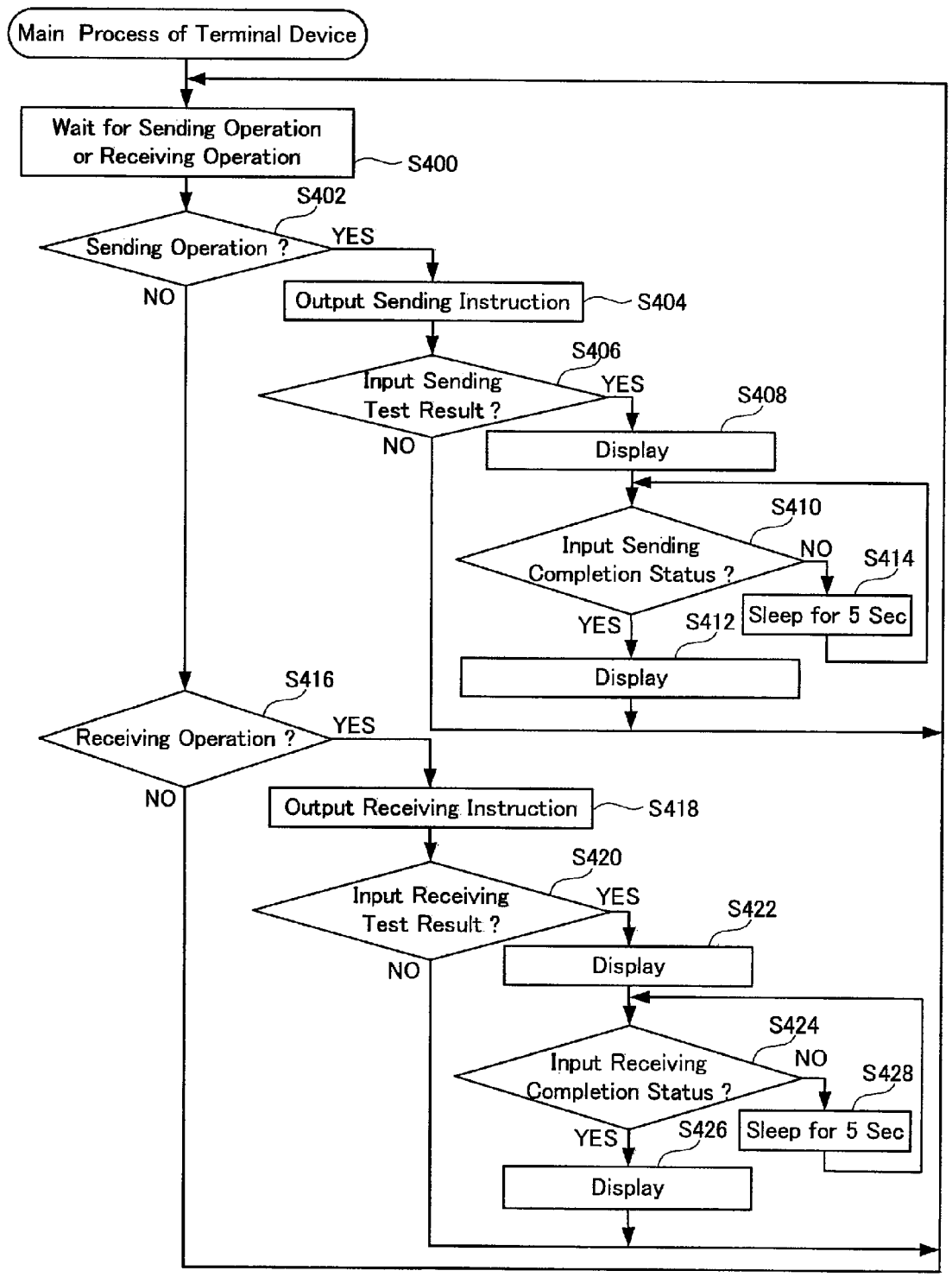
FIG. 13 is a flowchart of a main process of the terminal device (third embodiment).

FIG. 13 is a flowchart of the main process of the terminal device 70 according to the present embodiment. The main process of the terminal device 70 is substantially the same as that of the second embodiment. The different features from those of the second embodiment will be described below.

(1) The terminal device 70 determines whether or not a sending completion status is input after the display of the sending test result (S410). In the second embodiment, it is determined whether or not the sending enable status is input (S310).

(2) When the sending completion status is input (YES in S410), the terminal device 70 displays a sending completion message (S412). In the second embodiment, the sending enable message is displayed (S312).

(3) The terminal device 70 determines whether or not the receiving completion status is input after the display of the receiving test result (S424). In the second embodiment, it is determined whether or not the receiving enable status is input (S324).

(4) When the receiving completion status is input (YES in S424), the terminal device 70 displays a receiving completion message (S426). In the second embodiment, the receiving enable message is displayed (S426).

In the case where the e-mail receiving instruction is input while the information of the failure in the sending test result is stored in the temporary storage area 56b (NO in S254 shown in FIG. 10), the multi-function device 50 of the third embodiment stores the ID for identifying the terminal device 70 that output sending instruction. In the case where the e-mail receiving instruction is input while the information of the failure in the receiving test result is stored in the temporary storage area 56b (NO in S262 shown in FIG. 10), the multi-function device 50 stores the ID for identifying the terminal device 70 that output the receiving instruction. These processes are executed in the same way as in the second embodiment. The ID of the terminal device 70 stored in the temporary storage area 56b is used in the status sending process in the multi-function device to be described later.

(Status Sending Process of the Multi-Function Device)

Figure 14:
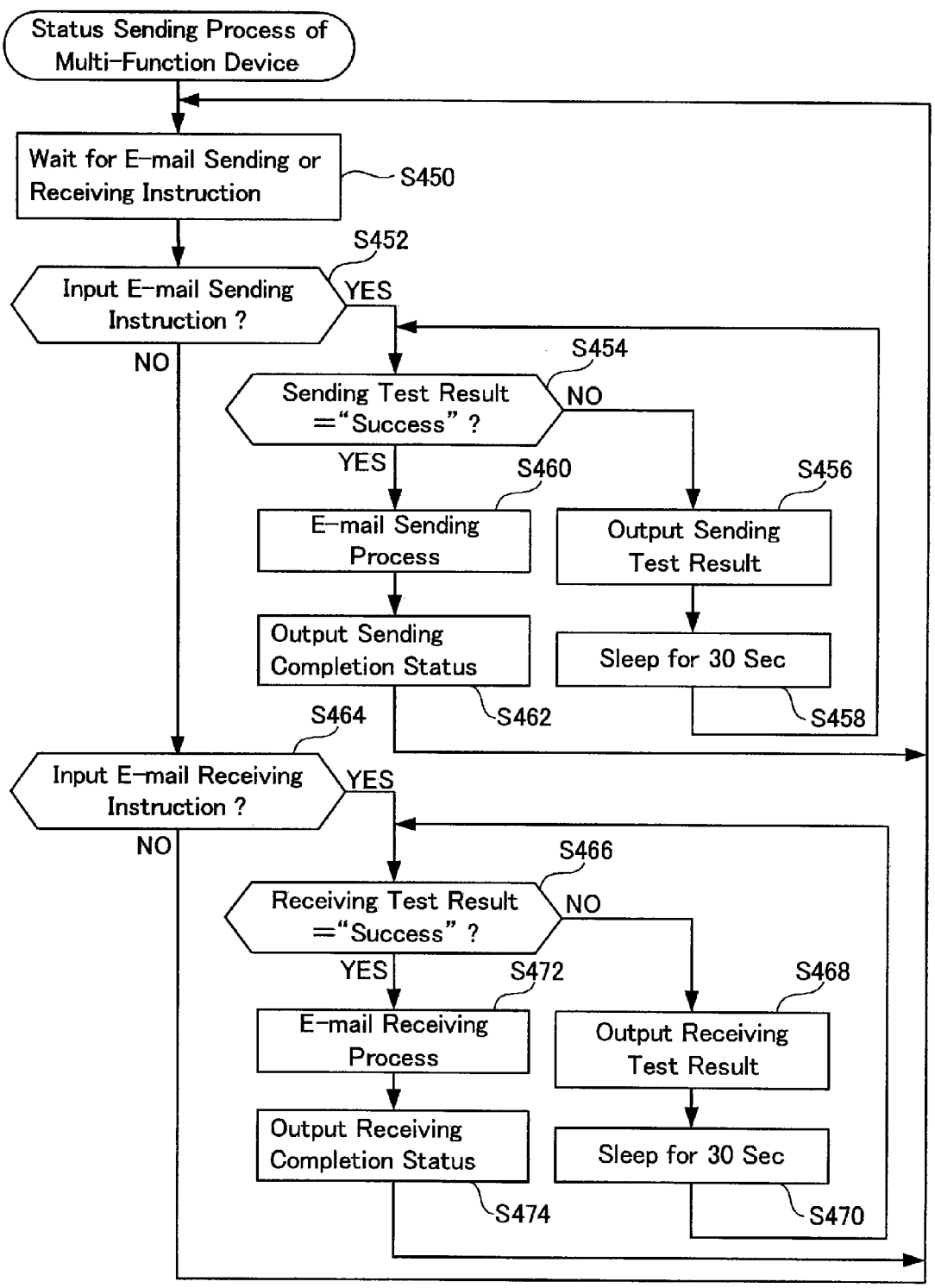
FIG. 14 is a flowchart of a status sending process of the multi-function device.

The processes in S450 to S454 shown in FIG. 14 are the same as those in S250 to S254 shown in FIG. 10. The explanation of the processes in S450 to S454 will thus be omitted. If NO is obtained in S454, the multi-function device 50 outputs the sending test result to the terminal device 70 which output the sending instruction (S456). Then, the multi-function device 50 is brought into a sleep state for 30 seconds (S458). After the elapse of 30 seconds in the sleep state, the multi-function device 50 allows the process to return to S454 where it is determined whether or not the sending test result has changed to be successful. If YES is obtained in S454, the multi-function device 50 executes the e-mail sending process (S460). The step is identical to the step in S256 shown in FIG. 10. Execution of the step in S460 via S456 and S458 indicates that the sending instruction is input during the failure in the sending test result, and then the sending test result has changed to be successful. In this case, the sending process is executed in accordance with the sending instruction during the failure in the sending test result. More specifically, the process that sends the e-mail to the mail address designated by the sending instruction input during the failure in the sending test result is executed. The multi-function device 50 outputs the sending completion status to the terminal device 70 which output the sending instruction (S462). In the case where the sending instruction is input during the failure in the sending test result, the ID of the terminal device 70 which output the sending instruction is stored in the temporary storage area 56b. In S462, the sending completion status is output to the terminal device 70 which output the sending instruction during the failure in the sending test result. The sending completion status contains the information indicating that the e-mail has been sent. As described above, the terminal device 70 displays the content of the sending completion status (see S412 shown in FIG. 13). The user is thus informed that the e-mail has been sent.

The process steps in S464 and S466 shown in FIG. 14 are the same as those in S260 and S262 shown in FIG. 10. The explanation with respect to the steps in S464 and S466 will thus be omitted. If NO is obtained in S466, the multi-function device 50 outputs the receiving test result to the terminal device 70 which output the receiving instruction (S468). Then, the multi-function device 50 is brought into a sleep state for 30 seconds (S470). After the elapse of 30 seconds in the sleep state, the multi-function device 50 allows the process to return to S466 where it is determined whether or not the receiving test result has changed to be successful. If YES is obtained in S466, the multi-function device 50 executes the e-mail receiving process (S472). The process step is the same as S264 shown in FIG. 10. Execution of S472 via S468 and S470 indicates that the receiving instruction is input during the failure in the receiving test result, and then the receiving test result has changed to be successful. In this case, in S472, the receiving process is executed in accordance with the receiving instruction input during the failure in the receiving test result. The multi-function device 50 outputs the receiving completion status to the terminal device 70 which output the receiving instruction (S474). In the case where the receiving instruction is input during the failure in the receiving test result, the ID of the terminal device 70 which output the receiving instruction is stored in the temporary storage area 56b. In S462, the receiving completion status is output to the terminal device 70 which output the receiving instruction during the failure in the receiving test result. The receiving completion status contains the information indicating that the e-mail has been received. As described above, the terminal device 70 displays the content of the receiving completion status (see S426 shown in FIG. 13). The user is thus informed of the e-mail reception.

Fourth Embodiment

Figures 15, 16:
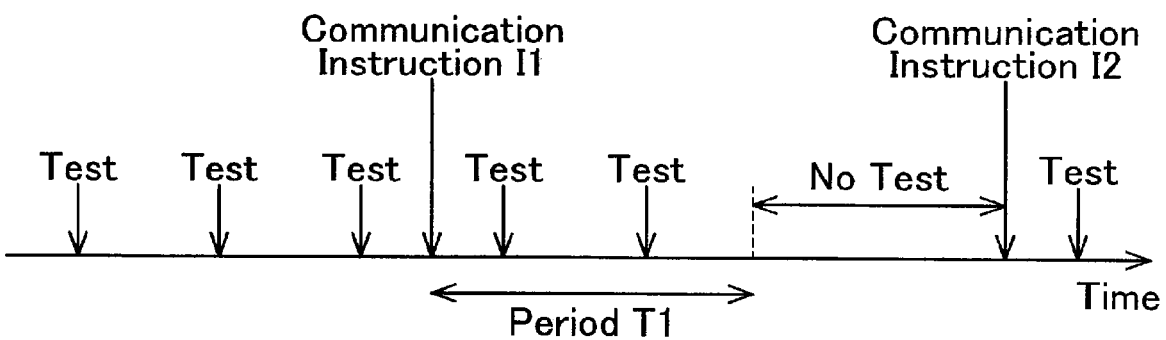
FIG. 15 is a view showing an example of communication test setting data (fourth embodiment).
FIG. 16 is a view showing an example of a timing chart of a communication test process (fifth embodiment).

In the above-described embodiments, when the user sets the e-mail communication test (sending test and receiving test) to be executed, the communication test is periodically executed (see FIG. 5). In a fourth embodiment, the user is allowed to determine the frequency at which the multi-function device 50 executes the communication test. The multi-function device 50 stores the communication test setting data. FIG. 15 shows an example of the communication test setting data. The communication test setting data may be input by the user who operates the operation device 60 (see FIG. 1) of the multi-function device 50. The communication test setting data may be input to the terminal device 70. In this case, the terminal device 70 outputs the communication test setting data to the multi-function device 50. The user is allowed to select the mode of executing the communication test between the regular mode and the irregular mode (reference number 150). In the example shown in FIG. 15, the irregular mode is selected. The user is allowed to determine the test frequency for executing the communication test (reference number 152). In the example shown in FIG. 15, the frequency of one minute is selected. In the case where the communication test at the irregular mode is selected, the user is allowed to determine the untested period (reference number 154). In the example shown in FIG. 15, the untested period is set from 20 to 7 o'clock. In the example shown in FIG. 15, the communication test is executed at every minute from 7 to 20 o'clock, and the test is not executed from 20 to 7 o'clock.

Fifth Embodiment

FIG. 16 is an example of the timing chart of the communication test process executed by the multi-function device 50 according to the present embodiment. The multi-function device 50 of the fifth embodiment is provided with a timer which is built in the controller 54 (see FIG. 1). The multi-function device 50 restarts the timer at every input of the communication instruction (sending instruction and receiving instruction). When the timer count exceeds a predetermined time T1, execution of the communication test is stopped. In the example shown in FIG. 16, the communication instruction is not input until the elapse of the time T1 from the time when the communication instruction I1 is input.

In this case, the multi-function device 50 does not execute the communication test until the next communication instruction 12 is input.

The multi-function device 50 may be structured to include timers for the sending instruction and the receiving instruction, respectively. In this case, the multi-function device 50 stops execution of the communication test until the elapse of the predetermined time from the input of the last sending instruction. The multi-function device 50 resumes the sending test upon the input of the sending instruction while the sending test is stopped. At the elapse of the predetermined time from the time when the last receiving instruction is input, execution of the receiving test is stopped. Upon the input of the receiving instruction while the receiving test is stopped, the multi-function device 50 restarts the receiving test.

Sixth Embodiment

The multi-function device 50 according to the present embodiment includes a counter for counting the number of times that the communication instruction (sending instruction and receiving instruction) is input. The counter is built in the controller 54 (see FIG. 1). The counter counts the number of times of the communication instructions that have been input in a predetermined period of time (for example, one day). The multi-function device 50 determines the frequency of the communication test such that the communication test is executed with a frequency less than the counted number of times. For example, in the case where the counted number of times per day is 1200 times (50 times/hour), the multi-function device 50 may determine to execute the communication test with a frequency of 30 times/hour (that is, at every 2 minutes).

The multi-function device 50 may be structured to have counters for the sending instruction and the receiving instruction, respectively. In this case, the multi-function device 50 counts the number of times of the sending instruction input in the predetermined period, and counts the number of times of the receiving instruction input in the predetermined period. The multi-function device 50 determines the frequency of the sending test such that the sending test is executed with a frequency less than the counted number of times of the sending instruction. The multi-function device 50 determines the frequency of the receiving test such that the receiving test is executed with a frequency less than the counted number of times of the receiving instruction.

The above embodiments are merely exemplary and intended in no way to limit the scope of the claims. Various modifications and variations of the embodiments described herein are included in the scope of the claims.

(1) The multi-function device 50 of the first embodiment may be structured to communicate e-mail through an interruption process when inputting the e-mail communication instruction (sending instruction or receiving instruction) during the period from the start to the end of the communication test (sending test or receiving test).

(2) The multi-function device 50 and the servers 80, 82 may be connected via LAN.

(3) The technical feature of the multi-function device 50 as described above is applicable to other e-mail communication devices, for example, a personal computer, a server, a telephone (including a cell phone) and the like.

(4-1) The multi-function device 50 does not have to execute the sending test while the sending test result of the success is stored in the temporary storage area 56b. The multi-function device 50 executes the e-mail sending process (see S256 shown in FIG. 10) upon the input of the sending instruction.

In the case where the e-mail sending cannot be performed by the sending process, the failure in the e-mail sending through the SMTP server 82 is informed. In this case, the information which indicates the failure in sending will be stored. The multi-function device 50 executes the sending test at a predetermined timing while the information indicating the failure in sending is stored.

(4-2) The multi-function device 50 does not have to execute the receiving test while the receiving test result of the success is stored in the temporary storage area 56*b*. Upon the input of the receiving instruction, the multi-function device 50 executes the e-mail receiving process (see S264 shown in FIG. 10). In the case where the e-mail receiving cannot be performed by the receiving process, the failure in the e-mail receiving through the POP3 server 80 is informed. In this case, the information indicating the failure in receiving is stored. The receiving test is executed at a predetermined timing while the information indicating the failure in receiving is stored.

(5) The multi-function device 50 may not execute the communication test. In this case, the multi-function device 50 may be structured to obtain the information indicating whether or not the e-mail can be communicated through the servers 80, 82 according to the following process.

(5-1) The multi-function device 50 executes the e-mail communication process (see S256, S264 shown in FIG. 10) upon the input of the communication instruction (sending instruction or receiving instruction). In the case where the e-mail communication cannot be executed due to the communication process, the multi-function device 50 can know that the e-mail communication through the servers 80, 82 is disabled. In this case, the information indicating the communication disable status of sending or receiving is stored in the temporary storage area 56*b*.

(5-2) In the case where the communication disable status of the e-mail communication caused by the servers 80, 82 is released, the servers 80, 82 may function to report that the communication disable status has been released to the multi-function device 50. The multi-function device 50 receives the report from the servers 80, 82 to be informed that the communication disabled status has been changed to the communication enable status.

The technological elements described in the specification and the drawings may be combined to provide technological advantages. The combination of those elements is not limited to the combination specified in the claims. The exemplary technology described herein is intended to achieve a plurality of objects simultaneously, and exhibits the technological usefulness by achieving one of those objects.

What is claimed is:

1. An electronic mail communication device used in connection with an electronic mail sending server for sending an electronic mail and an electronic mail receiving server for receiving an electronic mail, the electronic mail communication device configured to be connected to at least one terminal device, the electronic mail communication device comprising:

an input device that inputs an electronic mail communication command output from the terminal device;

a storage that stores either a first value indicating that an electronic mail sending through the electronic mail sending server is enabled or a second value indicating that the electronic mail sending through the electronic mail sending server is disabled, and stores either a third value indicating that an electronic mail receiving through the electronic mail receiving server is enabled or a fourth value indicating that the electronic mail receiving through the electronic mail receiving server is disabled; and a communication control device that outputs a signal to the electronic mail sending server to establish connection with the electronic mail sending server in a case where an electronic mail sending command is input to the input device while the first value is stored in the storage, wherein the communication control device inhibits from outputting the signal to the electronic mail sending server in a case where the electronic mail sending command is input to the input device while the second value is stored in the storage, wherein the communication control device outputs a signal to the electronic mail receiving server to establish connection with the electronic mail receiving server in a case where an electronic mail receiving command is input to the input device while the third value is stored in the storage, the communication control device inhibits from outputting the signal to the electronic mail receiving server in a case where the electronic mail receiving command is input to the input device while the fourth value is stored in the storage, wherein the communication control device tests whether or not the electronic mail sending through the electronic mail sending server is enabled when the second value is stored in the storage, and stores the first value in place of the second value in a case where the test shows that the electronic mail sending through the electronic mail sending server is enabled, in a case where the electronic mail sending command is input to the input device while the second value is stored in the storage, and then the first value is stored in place of the second value, the communication control device automatically executes an electronic mail sending process in accordance with the electronic mail sending command, wherein the communication control device tests whether or not the electronic mail receiving through the electronic mail receiving server is enabled when the fourth value is stored in the storage, and stores the third value in place of the fourth value in a case where the test shows that the electronic mail receiving through the electronic mail receiving server is enabled, in a case where the electronic mail receiving command is input to the input device while the fourth value is stored in the storage, and then the third value is stored in place of the fourth value, the communication control device automatically executes an electronic mail receiving process in accordance with the electronic mail receiving command.

2. The electronic mail communication device as in claim 1, wherein in a case where the electronic mail sending command output from the terminal device is input to the input device while the second value is stored in the storage, then the first value is stored in place of the second value, and then the electronic mail sending process is automatically executed, the communication control device outputs information indicating that the electronic mail sending process has been executed to the terminal device, and in a case where the electronic mail receiving command output from the terminal device is input to the input device while the fourth value is stored in the storage, then the third value is stored in place of the fourth value, and then the electronic mail receiving process is automatically executed, the communication control device outputs information indicating that the electronic mail receiving process has been executed to the terminal device.

3. The electronic mail communication device as claim 1, wherein
the communication control device tests by outputting a signal to the electronic mail sending server and checking a response from the electronic mail sending server.

4. The electronic mail communication device as in claim 1, further comprising:
a user authentication storage that stores a user identification and a password,
wherein the communication control device tests by determining whether the user identification and the password stored in the user authentication storage are registered by the electronic mail receiving server.

5. The electronic mail communication device as in claim 1, further comprising:
a user authentication storage that stores a user authentication method,
wherein the communication control device tests by determining whether the user authentication method stored in the user authentication storage is identical to a user authentication method that the electronic mail sending server is capable of executing.

6. The electronic mail communication device as in claim 1, further comprising:
a user authentication storage that stores a user authentication method,
wherein
in a case where the user authentication method stored in the user authentication storage is SMTP-AUTH, the communication control device obtains a list of SMTP-AUTH authentication mechanisms that can be executed by the electronic mail sending server, and tests by making the electronic mail sending server execute a user authentication with priority the authentication mechanism having the highest security level out of the authentication mechanisms included in the list.

7. The electronic mail communication device as in claim 1, wherein
the communication control device tests by attempting to send an electronic mail to a predetermined electronic mail address through the electronic mail sending server.

8. The electronic mail communication device as in claim 1, wherein
the communication control device does not test whether or not the electronic mail sending through the electronic mail sending server is enabled while the first value is stored in the storage, and
the communication control device does not test whether or not the electronic mail receiving through electronic mail receiving server is enabled while the third value is stored in the storage.

9. A computer readable medium for an electronic mail communication device used in connection with an electronic mail sending server for sending an electronic mail and an electronic mail receiving server for receiving an electronic mail, the electronic mail communication device configured to be connected to at least one terminal device, the computer readable medium including instructions for ordering a computer mounted on the electronic mail communication device to perform:
storing either a first value indicating that an electronic mail sending through the electronic mail sending server is enabled or a second value indicating that the electronic mail sending through the electronic mail sending server is disabled, and storing either a third value indicating that an electronic mail receiving through the electronic mail receiving server is enabled or a fourth value indicating that the electronic mail receiving through the electronic mail receiving server is disabled;
outputting a signal to the electronic mail sending server to establish connection with the electronic mail sending server in a case where an electronic mail sending command output from the terminal device is input while the first value is stored; and
inhibiting from outputting the signal to the electronic mail sending server in a case where the electronic mail sending command is input while the second value is stored,
outputting a signal to the electronic mail receiving server to establish connection with the electronic mail receiving server in a case where an electronic mail receiving command is input while the third value is stored in the storage, inhibiting from outputting the signal to the electronic mail receiving server in a case where the electronic mail receiving command is input while the fourth value is stored in the storage,
testing whether or not the electronic mail sending through the electronic mail sending server is enabled when the second value is stored in the storage, and storing the first value in place of the second value in a case where the test shows that the electronic mail sending through the electronic mail sending server is enabled,
in a case where the electronic mail sending command is input while the second value is stored in the storage, and then the first value is stored in place of the second value, the communication control device automatically executes an electronic mail sending process in accordance with the electronic mail sending command,
testing whether or not the electronic mail receiving through the electronic mail receiving server is enabled when the fourth value is stored in the storage, and storing the third value in place of the fourth value in a case where the test shows that the electronic mail receiving through the electronic mail receiving server is enabled,
in a case where the electronic mail receiving command is input while the fourth value is stored in the storage, and then the third value is stored in place of the fourth value, the communication control device automatically executes an electronic mail receiving process in accordance with the electronic mail receiving command.

10. A system comprising:
at least one terminal device; and
an electronic mail communication device used in connection with an electronic mail sending server for sending an electronic mail and an electronic mail receiving server for receiving an electronic mail,
wherein the terminal device comprises an output device that outputs an electronic mail communication command,
wherein the electronic mail communication device comprises:
an input device that inputs the electronic mail communication command output from the terminal device;
a storage that stores either a first value indicating that an electronic mail sending through the electronic mail sending server is enabled or a second value indicating that the electronic mail sending through the electronic mail sending server is disabled, and stores either a third value indicating that an electronic mail receiving through the electronic mail receiving server is enabled or a fourth value indicating that the electronic mail receiving through the electronic mail receiving server is disabled; and a communication control device that outputs a signal to the electronic mail sending server to establish connection with the electronic mail sending server in a case where an electronic mail sending command is input to the input device while the first value is stored in the storage, wherein the communication control device inhibits from outputting the signal to the electronic mail sending server in a case where the electronic mail sending command is input to the input device while the second value is stored in the storage, wherein the communication control device outputs a signal to the electronic mail receiving server to establish connection with the electronic mail receiving server in a case where an electronic mail receiving command is input to the input device while the third value is stored in the storage, the communication control device inhibits from outputting the signal to the electronic receiving server in a case where the electronic mail receiving command is input to the input device while the fourth value is stored in the storage, wherein the communication control device tests whether or not the electronic mail sending through the electronic mail sending server is enabled when the second value is stored in the storage, and stores the first value of the second value in a case where the test shows that the electronic mail sending through the electronic mail sending server is enabled, in a case where the electronic mail sending command is input to the input device while the second value is stored in the storage, and then the first value is stored in place of the second value, the communication control device automatically executes an electronic mail sending process in accordance with the electronic mail sending command, wherein the communication control device tests whether or not the electronic mail receiving through the electronic receiving server is enabled when the fourth value is stored in the storage, and stores the third value in place of the fourth value in a case where the test shows that the electronic mail receiving through the electronic mail receiving server is enabled, in a case where the electronic mail receiving command is input to the input device while the fourth value is stored in the storage, and then the third value is stored in place of the fourth value, the communication control device automatically executes an electronic mail receiving process in accordance with the electronic mail receiving command.

* * * * *